United States Patent [19]
Carraway, Jr.

[11] Patent Number: 5,709,408
[45] Date of Patent: Jan. 20, 1998

[54] MOTORIZED SAFETY BELTS FOR VEHICLES

[76] Inventor: Bruce H. Carraway, Jr., 12 King's Bridge, Atlanta, Ga. 30329

[21] Appl. No.: 662,791

[22] Filed: Jun. 12, 1996

[51] Int. Cl.$^6$ .................................................. B60R 22/06
[52] U.S. Cl. ........................... 280/804; 180/268; 180/286; 297/469
[58] Field of Search ...................... 280/804, 802, 280/803, 808, 801.1; 180/270, 268, 273, 286; 297/469, 481, 482, 483

[56] References Cited

U.S. PATENT DOCUMENTS

| | | | |
|---|---|---|---|
| 3,799,577 | 3/1974 | Colucci | 280/802 |
| 3,830,518 | 8/1974 | Silber | 280/804 |
| 4,070,040 | 1/1978 | Igeta | 280/804 |
| 4,288,097 | 9/1981 | Ueda | 280/802 |
| 4,313,622 | 2/1982 | Suzuki et al. | 280/804 |
| 4,392,671 | 7/1983 | Fohl | 280/802 |
| 4,741,555 | 5/1988 | Frantom et al. | 280/804 |
| 4,779,700 | 10/1988 | Kataoka | 280/804 |
| 5,183,291 | 2/1993 | Shah | 280/804 |
| 5,452,918 | 9/1995 | Carraway, Jr. | 280/804 |

FOREIGN PATENT DOCUMENTS

94/22694  10/1994  WIPO ................... 280/804

Primary Examiner—Brian L. Johnson
Assistant Examiner—Peter C. English
Attorney, Agent, or Firm—Isaf, Vaughan & Kerr; Louis T. Isaf

[57] ABSTRACT

Motorized shoulder and lap belts are moved to restraining positions by a drive belt along a track around a doorway of a vehicle. A catch in a slot in the drive belt engages the shoulder belt to move with the lap belt which is attached to the drive belt. An adjustable height stop in the track stops and disengages the shoulder belt in the shoulder belt restraining position from the catch while the lap belt continues to move and stops in the lap belt restraining position. A persons weight in a seat of the vehicle and closing the vehicle door, if the vehicle ignition is turned on, activates a switch which moves the shoulder and lap belts into their restraining positions. With the person seated, the shoulder and lap belts are retracted by turning the vehicle ignition off, or by activating a switch located in the vehicle door handle, door post, or elsewhere in the vehicle. Sleeves located near where the shoulder and lap belts enter retractors are disposed around ends of the shoulder and lap belts. These sleeves are attached to inserts whose reversible motion and positioning, upon activation of an antenna-type motor, comfortably facilitate either holding the ends of the shoulder and lap belts out in front of, and away from, the seated person, or positioning the ends of the these belts around the body of the seated person. A motor controlling circuit drives a belt which positions the shoulder and lap belts between restraining and releasing positions.

19 Claims, 10 Drawing Sheets

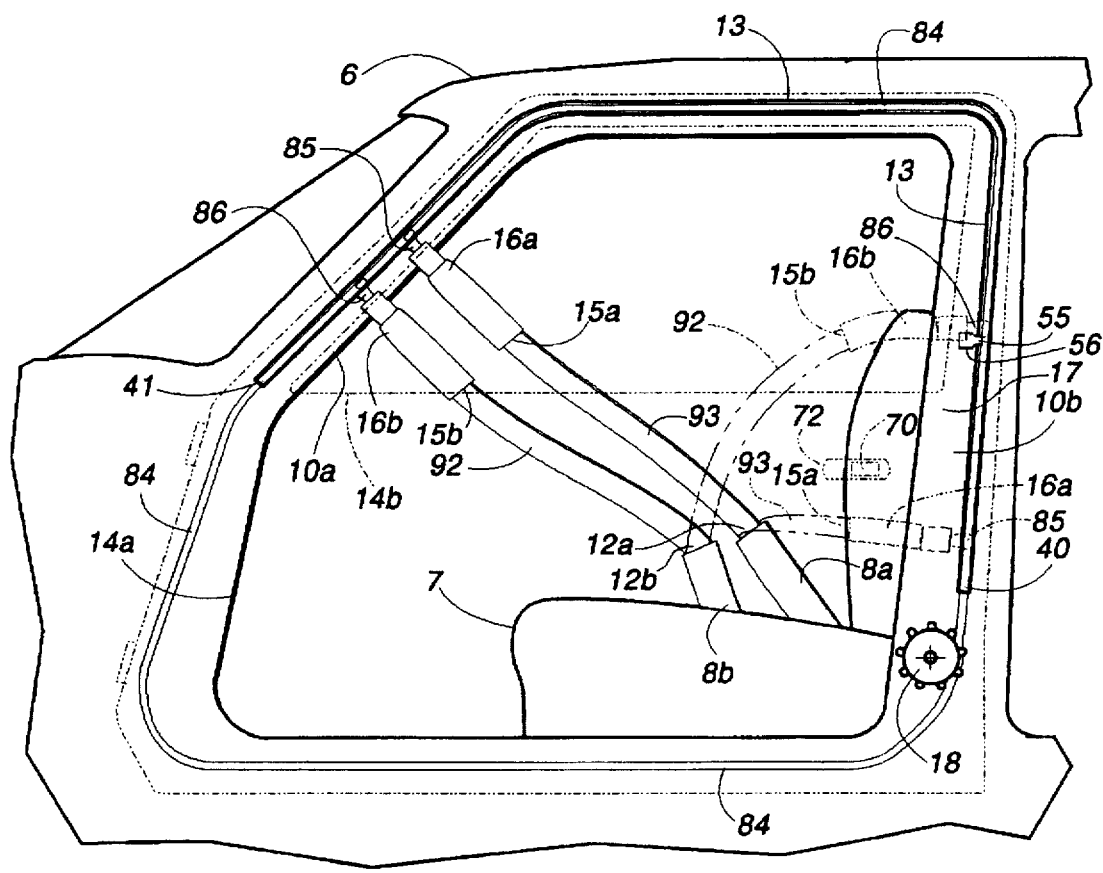
FIG. 1
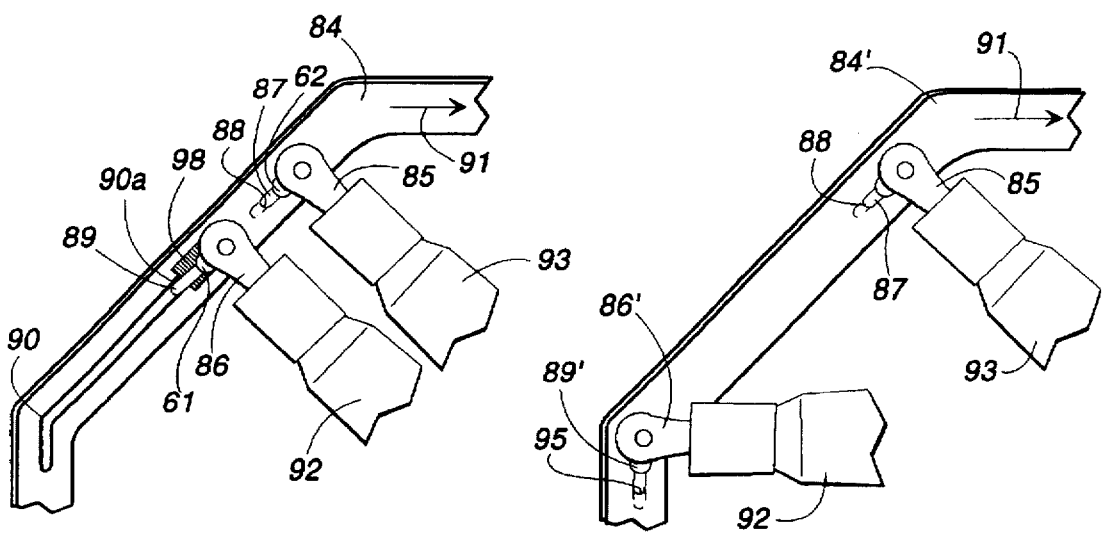
FIG. 2   FIG. 3

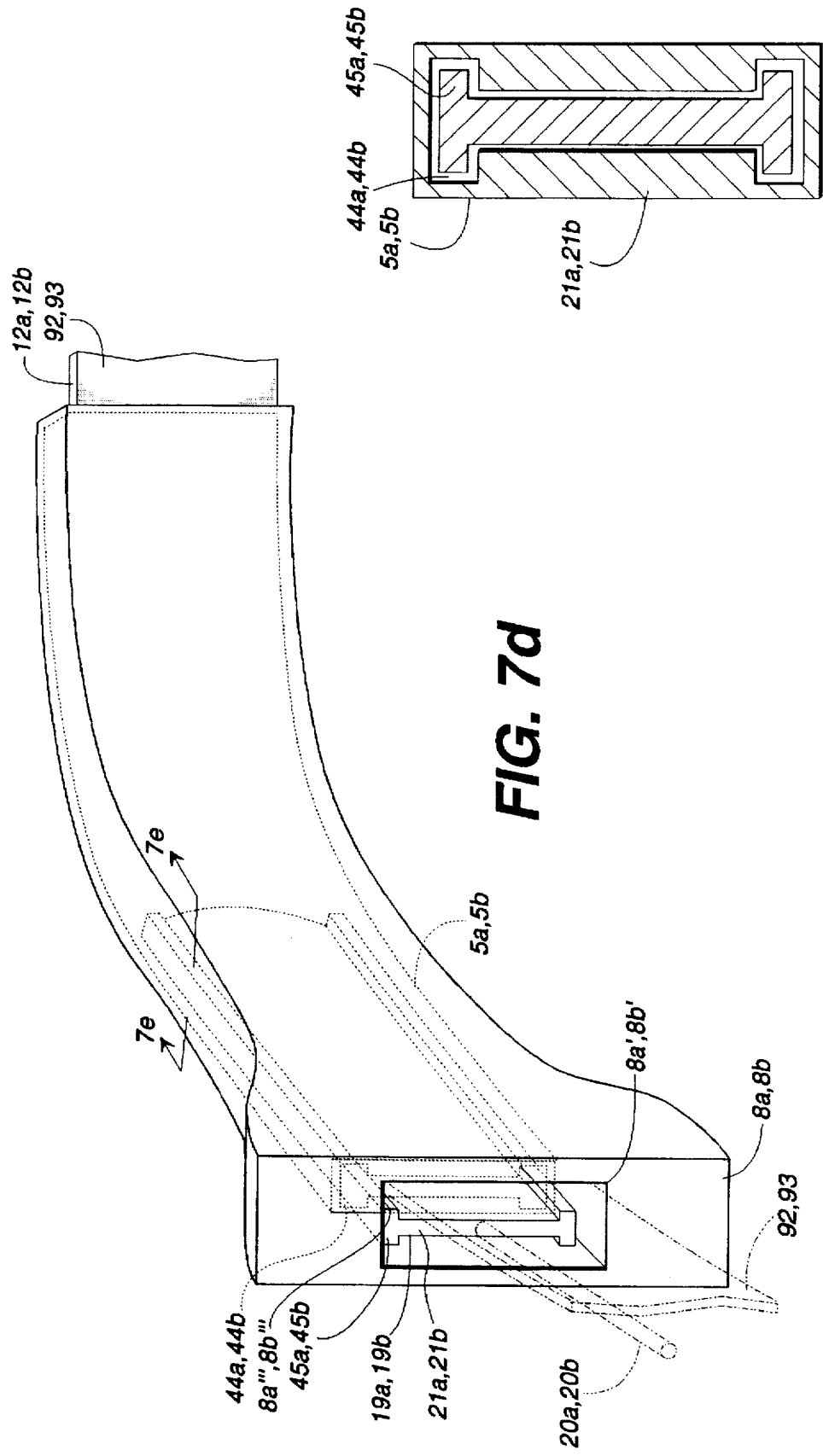

MOTORIZED SAFETY BELTS FOR VEHICLES

BACKGROUND OF THE INVENTION

1. Field of the Invention

The present invention relates generally to the field of vehicle safety belts. In particular, it relates to a motorized bi-level restraint system at both a lap and a shoulder level of a person on a seat in a vehicle.

2. Description of the Prior Art

Automatic motorized shoulder belts for passive safety restraint in vehicles are produced and used quite commonly. Shoulder restraints alone decrease injuries from head contact with a windshield or steering wheel. However, it does not prevent injuries from lower-body contact with front portions of a vehicle. Midsections, spines, knees and most other parts of the body are left unprotected with only a shoulder belt.

People tend to use a manual lap belt even less when they have a motorized shoulder belt than when they don't have a motorized shoulder belt. Psychologically, they think they are secure when the motorized shoulder belt goes into position, and they only buckle their manual lap belt 30% of the time. The National Highway Traffic Safety Administration reports that the current usage of manual lap belts and manual shoulder belts is about sixty percent (60%), whereas the usage of motorized shoulder belts exceeds ninety-one percent (91%). It is reasonable to expect that the usage of motorized lap belts would also exceed ninety-one percent (91%) if added to motorized shoulder belts. This would amount to a 50% increase in lap belt usage.

Prior art patents in the motorized safety belt field include U.S. Pat. No. 3,830,518 granted to Silber. Silber discloses a motorized bi-level safety belt with an attachment end that travels in a rail along a vehicle ceiling in a circular route to circumvent the body of a person on a seat in the vehicle. The rail extends down a door post of the vehicle to a low seat-level position for a lap belt and to a separate higher shoulder position for a shoulder belt. However, in the patent to Silber, the ceiling positioning routes the belts too close to an individual in order to circumvent a steering wheel and prevents the use of open or sun roofs while obstructing vision.

U.S. Pat. No. 4,070,040 granted to Igeta is a slight change of the Silber device, but provides substantially the same ceiling-mounted rail as disclosed by Silber and has similar routing limitations.

U.S. Pat. No. 4,313,622 granted to Suzuki et al. discloses a thick belt for holding an attachment end of a motorized shoulder belt. The belt travels in a rail from a front door post to a rear door post and then travels part way down the rear door post to shoulder level. However, the patent to Suzuki does not provide for a lap belt with a second attachment end to travel to seat level.

U.S. Pat. No. 4,392,671 granted to Föhl further advances the Suzuki device with the elimination of the lap belt. The Föhl patent also discloses a combined door-mounted restraint that has not found popular acceptance and is not relevant to the present invention.

U.S. Pat. No. 5,183,291 granted to Shah discloses, in one embodiment, a shoulder belt track and a lap belt means that are positioned in a ceiling like the patent to Silber. The patent to Shah tends to only describe problems instead of structural solutions. The problems of the prior art remain unsolved in the patent to Shah. However, some of these prior art problems as web as other problems are solved with the present invention.

SUMMARY OF THE INVENTION

The present invention and this application are related to U.S. Pat. No. 5,452,918 which is incorporated herein by reference.

Briefly described, the present invention includes an apparatus and method for a motorized bi-level safety belt restraining system for a vehicle seat occupant. The provision of such a system is desirable in light of former President George Bush's 1992 safety belt program, which reported that "3,700 lives and 8 times that many serious injuries could be saved annually by getting seat belt usage from 60% up to 70%." Thus, adding a motorized lap belt to a motorized shoulder belt should help increase safety belt usage up to approximately 91% to 97%, which represents an increase of over 50%. With such an increase, 10,000 or more lives a year may be saved and eight times that many, or 80,000, serious injuries may be prevented annually.

Furthermore, the National Highway Traffic Safety Administration of the U.S. Department of Transportation published a report in June, 1992, entitled "Evaluation of the Effectiveness of Occupant Protection", Standard 208. The report indicated that 91% to 97% of drivers accept and use motorized shoulder belts when they are installed. This study may indicate that the addition of a motorized lap belt will be accepted by vehicle occupants and should help them comply with wearing motorized lap belts in addition to shoulder belts since they are automatic and motorized.

The present invention, therefore, is directed at saving lives by increasing seat belt wearing compliance. Accordingly, a motorized safety belt system, in a preferred embodiment of the present invention, is provided which includes a catch that is located at the rear end of a slot several inches long in a drive belt or conveyer. The slot engages or apprehends a shoulder belt connector (anchor) at one end of the shoulder belt. The catch is used to reversibly pull the shoulder belt connector, and thus, the shoulder belt, indirectly with the drive belt, as the drive belt moves, over most of the range of motion of the drive belt along a single track. In contrast, a lap belt connector at one end of the lap belt is attached to the drive belt itself (i.e., without a catch), and the drive belt directly and reversibly pulls the lap belt connector, and thus, the lap belt, as the drive belt moves, over the full range of the motion of the drive belt along the single track. In this arrangement, both the shoulder belt and the lap belt are pulled together at a fixed distanced apart for most of the range of motion of the drive belt.

In one direction, the belts are positioned toward the front of the vehicle near the top of a doorway of a vehicle in the inoperative position. The catch is located at the rear of the slot which is used to apprehend and hold the shoulder belt to move at a distance of approximately one to two inches apart from the lap belt in a preferred embodiment. In moving to its operative position, the shoulder belt moves until a shoulder belt connector which is affixed to the shoulder belt is stopped by or at a stop on a door post of the doorway. The drive or conveyer belt continues to move past the stop with the stop forcing the release of the connector from the catch (e.g., for a magnetic catch in a preferred embodiment, the mechanical force of the shoulder belt connector striking the stop overcomes the magnetic force attracting the connector to the magnetic catch), so that the slot continues to follow the lap belt connector to the lap belt terminating operative position proximate seat level of a seat in the vehicle, while the shoulder belt connector is stopped and locked in the shoulder belt terminating operative position at the stop. When the drive belt pulls the safety belts back toward an inoperative position above the doorway (i.e., in the opposite direction from the direction described above), the shoulder belt connector is again apprehended and held by the catch (magnetic, clasp, or other type of catch) at the end of the slot such that the shoulder belt is again pulled along with the lap belt.

The motorized lap and shoulder belts are positioned out and away from an occupant of a vehicle seat as the belts move between inoperative (or body-release) positions and operative (or body-restraint) positions. End portions of the belts are located on the inside of curved semi-rigid plastic sleeves. Also, the ends of the motorized lap and shoulder belts located nearest a track over a vehicle doorway are curved and rigid over several inches (and wide surfaces of these ends of the belts turn upward as the belts move into their operative positions), with the edges of the belts remaining soft. The ends of the safety belts curve well out in front of the vehicle seat occupant's body as they move into and out of their respective operative positions.

In an alternative embodiment in accordance with the present invention, a separate system, i.e., a separate track, drive or conveyer belt, motor, etc., is used for the motorized lap belt, instead of sharing the single track, drive or conveyer belt, and motor, etc. with the motorized shoulder belt.

In another embodiment in accordance with the present invention, a weight activated switch in a seat of a vehicle must be activated by the weight of an occupant in the seat in order to move the safety belts to their respective operative positions. A person returning to his or her vehicle will, therefore, not find that the safety belts need to be moved out of the way when he or she opens the vehicle door. This will also save wear on safety belt motors because their usage will be reduced. In contrast, the current technology is such that closing the vehicle door with the vehicle motor still running causes the motorized shoulder belt to go into the operative position even when there is no passenger in the passenger seat. Present restraint systems cause belt retraction to an inoperative position when a vehicle door opens in a vehicular accident while the vehicle engine is running (i.e., vehicle ignition on), thereby presenting potential life and death safety problems. This is because currently used motorized shoulder belts have activation switches located in doorways of a vehicle. For example, if a vehicle accident occurs and a vehicle door flies open as a result of the accident, such an activation switch may be toggled, possibly causing the removal of the safety belts from the vehicle seat occupant, leaving them unsecured. Therefore, to solve this problem, in yet another embodiment in accordance with the present invention, a switch is located in a door handle, the door post, or elsewhere in the vehicle (in different embodiments) which, only when thrown with the vehicle ignition turned on, causes the safety belts to return to an inoperative or body-release position. Note that this switch is also useful in a situation where a vehicle occupant wants either to exit the vehicle before the ignition switch is turned off, or to sit in the vehicle with the seat belts retracted in their inoperative positions. In this case, the vehicle occupant throws the switch to retract the safety belts to the inoperative position. Also, note that in certain alternative embodiments, two or more of this type of switch may be available in one vehicle, for example, one in the door handle and one in the door post, either of which may be used for the same purpose as described above according to the convenience or choice of the seat occupant.

It is, therefore, an objective of the present invention to provide motorized bi-level safety belts having movable anchors that do not hinder getting in and out of vehicles when the motorized bi-level safety belts are in a body-release mode.

Another objective of the present invention is to provide motorized bi-level safety belts which avoid closeness and contact with a vehicle seat occupant while movable anchors of the motorized bi-level safety belts travel between a body-release and a body-restraint mode.

Still another objective of the present invention is to provide bi-level safety belts having curved/semi-rigid plastic sleeves positioned over a lap belt and a shoulder belt to hold the ends of the belts curved out in front of an occupant of a vehicle seat near where the bi-level safety belts retract into a retractor coil between the vehicle front seats.

Yet another objective of the present invention is to provide a motorized arm for movably positioning curved/semi-rigid plastic sleeves sheathed over a lap belt and a shoulder belt of bi-level safety belts near where the lap and shoulder belts retract between a vehicle front seats to hold the ends of the belts away from the occupant of the vehicle seat.

Another object of the present invention is to provide a motorized arm which pulls back to allow safety belts to be positioned close to a vehicle seat occupant when the safety belts are in their operative position.

Another object of the present invention is to provide a switch to control the retraction of motorized safety belts in a vehicle with the vehicle ignition turned on.

One other object of the present invention is to provide a circuit to control movement of motorized safety belts between respective operative and inoperative positions.

Other objects, advantages, and features of the present invention will become apparent upon reading and understanding the present specification, when taken in conjunction with the accompanying drawings.

BRIEF DESCRIPTION OF DRAWINGS

FIG. 1 is a schematic side view of a doorway section, and a seat of a vehicle in relationship to motorized bi-level safety belts which are connected to a drive belt through a single track in accordance with the invention as viewed from outside the vehicle.

FIG. 2 is a schematic fragmentary perspective view from inside a vehicle showing one arrangement of the two belts in their respective inoperative or releasing positions from which they may be reversibly moved into their respective operative or restraining positions.

FIG. 3 is a view similar to FIG. 2 showing a modified arrangement.

FIG. 7d is a schematic end view of the insert of FIG. 7c located within a sleeve of a seat belt corresponding to an operative position of the insert.

FIG. 7e is an enlarged schematic cross sectional view of a portion of FIG. 7d along a portion of section 7e–7e.

DETAILED DESCRIPTION OF THE PREFERRED EMBODIMENTS

Figures 4, 5:
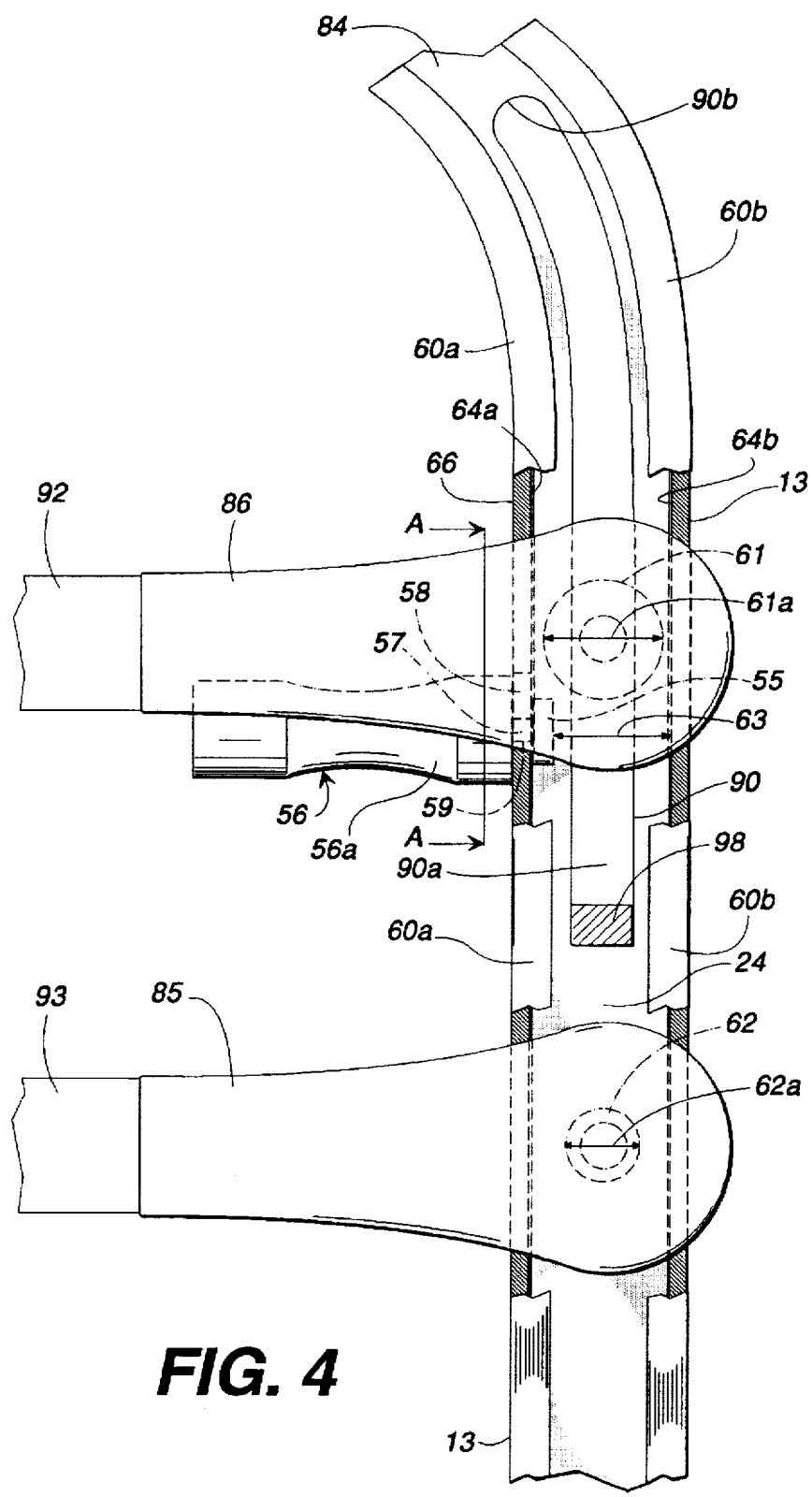
FIG. 4 is an enlarged, schematic fragmentary sectional view of a track showing a variable stop in relation to the ends of a lap belt and a shoulder belt.
FIG. 5 is an enlarged schematic view of a portion of the track where the stop can be positioned as viewed from a side of FIG. 4 along a portion of section A—A without the variable stop present.

Reference is now made to the drawings, and those embodiments of the invention here presented by way of illustration, wherein like reference numerals designate corresponding parts throughout the several figures.

FIG. 1 depicts a front seat 7 (although it could just as well be a rear or other seat) of a vehicle 6 with a restraint system shown according to the present invention as viewed from outside the vehicle 6. A driver's side doorway 14a is shown in the vehicle 6, with the seat 7 therein. Note that a door 14b is understood to be associated with the doorway 14a although the door 14b is not specifically schematically shown in any of the drawings. Extending partially around the doorway 14a is a stationary track 13. Adjacent to the track 13, but circumscribing the doorway 14a, is a drive belt or conveyer 84. The drive belt or conveyer 84 is driven by a sprocket 18, which can be rotated by an electric motor 104 (not shown in FIG. 1), hydraulic motor, or, other means as is well known to those skilled in the art.

In the restraint system, a shoulder belt 92 and a lap belt 93 have inoperative positions, wherein a movable end (finger) 89 of the shoulder belt 92 and a movable end (finger) 87 of the lap belt 93 are located at forward portion 10a of doorway 14a as shown in FIGS. 1 and 2. When the vehicle ignition is turned on, the sprocket 18 is caused to rotate clockwise (in the perspective of FIG. 1), thereby driving the drive belt 84 and the moving ends 87 and 89 to their respective body-restraining or operative positions, toward the rearward portion 10b of the doorway 14a. In FIG. 2, the motorized lap belt 93 rides in the track 13 (not shown in FIG. 2) along with the shoulder belt 92 and may be positioned adjacent to motorized shoulder belt 92 when in the inoperative position (see FIG. 2), or, alternatively, be positioned across the lap of the driver in the operative position (not shown in FIG. 2).

In conjunction with FIG. 1, looking now at FIG. 2, which shows a non-restraining or inoperative position of one embodiment of the present invention as viewed from inside the vehicle 6, drive belt 84 is shown in attached or engaged association with the connectors 85 and 86 on lap belt 93 and shoulder belt 92, respectively. Note that although track 13 is not shown in FIG. 2, it is to be understood that a portion of the length of the drive belt 84 moves within the track 13 over the total length of the track 13 in accordance with the present invention (see FIG. 4). In one embodiment of the present invention, drive belt 84 has connectors 85 and 86 which are trammeled by track or rail 13 (not shown in FIG. 2). In this embodiment, connector 85 has finger or metal nose 87 attached thereto which engages drive belt 84 in hole 88. On the other hand, connector 86 has finger or metal nose 89 attached thereto which is engaged and apprehended by catch 98 located at the end of slot 90 proximate to hole 88 in drive belt 84. In a preferred embodiment according to the present invention, catch 98 is a magnetic catch, i.e., catch 98 may be a magnet or include magnetic material which magnetically attracts, engages or holds finger 89. A magnetic catch 98 could be made of an appropriate magnetic material, appropriately shaped to best attract and magnetically hold or apprehend finger 89 according to the shape of magnetic catch 98. Although a magnetic catch is a preferred embodiment, it should be understood that other embodiments such as a hook, a clasp, or other type of catch would also work according to the present invention. Therefore, that catch 98 which is magnetic should not be viewed to overly limit the scope of the present invention.

With the above described arrangement, it will be understood that when the drive belt 84 is driven in the direction of the arrow 91, both shoulder belt 92 and lap belt 93 will be moved from their respective inoperative positions around track 13 toward the rearward portion 10b of doorway 14a, to door post 17 of vehicle 6. As drive belt 84 moves, both connectors 85 and 86 of lap belt 93 and shoulder belt 92, respectively, will move along track 13. Connector 85 of lap belt 93 will move until it reaches its terminating operative position proximate the rearward end 40 of track 13, proximate the seat cushion level of vehicle seat 7, wherein the lap belt 93 will be in a restraining or operative position across the lap of the occupant of vehicle seat 7.

Although connector 86 of shoulder belt 92 will move with drive belt 84, its motion requires further detail as will be discussed now. To wit, in the inoperative position, finger 89 of connector 86 is engaged and apprehended by catch 98. As drive belt 84 begins to move to the operative position, for instance, when the ignition of vehicle 6 is turned on, the finger 89 of connector 86 will be moved by belt 84, and thereby also move shoulder belt 92 as described. Connector 86 of shoulder belt 92 moves because it is apprehended by catch 98 at the rearward end 90a of slot 90. Drive belt 84 thereby moves belt 92 because of the engagement of catch 98 with connector 86. When connector 86 of shoulder belt 92 reaches the shoulder position (shown in dashed lines in FIG. 1) as connector 86 is being moved by drive belt 84, the finger 89 of connector 86 will encounter or strike belt stop 55 (see FIGS. 1 and 4) of track 13 so that shoulder belt 92 will stop in a restraining or operative position across the shoulder of the occupant of vehicle seat 7, wherein finger 89 is disengaged or released from catch 98 and slot 90 continues now to move past finger 89 until drive belt 84 stops with lap belt 93 in an operative position, and thus, the forward end 90b of slot 90 is proximate the finger 89 and prevents movement of connector 86 back toward the inoperative position as will be described below. Also, in a preferred embodiment according to the present invention, and as schematically illustrated in FIG. 4, stop 55 is a circular stop pin which will also be described in more detail below.

When the occupant is ready to exit from vehicle 6, sprocket 18 will be driven in a reverse direction to the direction of motion described above, causing drive belt 84 to move in the opposite direction to that just described. Connectors 85 and 86 will therefore be moved from respective restraining positions at the rear 10b of the doorway, which is shown in broken lines in FIG. 1, to the releasing or inoperative position at the forward portion 10a of the doorway 14a, which is shown in full lines in FIG. 1. Connector 85 will, of course, be moved immediately with drive belt 84 since it is fixedly connected to drive belt 84 by nose 87. Connector 86, however, will be delayed in moving, because of the length of slot 90 which must first pass by finger 89. As belt 84 continues to move along track 13, slot 90 will eventually have moved far enough for finger 89 of connector 86 to again be apprehended by catch 98. Then connectors 85 and 86 can move together a fixed distance apart again, e.g., approximately 1 to 2 inches or so apart in the preferred embodiment, because catch 98 is positioned at the end of slot 90 approximately 1 to 2 inches or so from hole 88 where nose 87 is connected.

As has been described above, in moving to its operative position, connector 86 is stopped as it engages belt stop 55, which exerts enough mechanical force to overcome the force of engagement (magnetic or otherwise) between finger 89 and catch 98. This mechanical interaction causes catch 98 to pull away from finger 89 of connector 86, leaving the vehicle seat occupant secured by shoulder belt 92 with connector 86 in its operative position at stop 55. On the other hand, for the vehicle seat occupant to be released from the restraint system, shoulder belt connector 86 will again be apprehended by catch 98 for motion of belt 84 toward the inoperative (retracted) position at the forward portion 10a of doorway 14a. Shoulder belt connector 86 and lap belt connector 85 will be positioned together in their respective inoperative positions because of catch 98 at the end of slot 90 in drive belt 84 which is proximate hole 88. Connector 86 will remain apprehended by catch 98 and spaced a fixed distance from connector 85 until these connectors and the lap 93 and shoulder 92 belts move to their operative positions, whereupon stop 55 separates connector 86 again from catch 98 upon activation of the vehicle restraint system.

Attention is next directed to FIG. 3 in conjunction with FIG. 1 of the drawings. FIG. 3 schematically presents an alternative embodiment in accordance with the present invention, wherein connectors 85 and 86' are fixedly spaced away from each other along drive belt 84' by several inches. In the preferred embodiment, the fixed spacing is approximately 24 to 30 inches. Note that FIG. 3 is similar to FIG. 2, except that finger 89' extends instead into single hole 95 defined in belt 84' rather than a slot such as slot 90 of FIG. 2. With the use of holes 95 and 88, both connectors 85 and 86', and hence both belts 93 and 92, will move as soon as drive belt 84' moves in the direction of (toward operative positions), or opposite to the direction of (toward inoperative positions), arrow 91 as depicted in FIG. 3. In accordance with the initial spacing of connectors 85 and 86', belts 93 and 92 will move into their restraint or operative positions while the spacing is maintained between connects 85 and 86'. Upon retraction towards the forward end 41 of track 13, i.e., towards their inoperative positions, belts 93 and 92 will move simultaneously, again maintaining their separation and the fixed separation of connectors 85 and 86'.

Referring again to the above embodiments in accordance with the present invention as shown in FIGS. 2 and 4, a fixed stop 55 stops the movement of shoulder belt 92 in its operative position while slot 90 continues to move past finger 89 until lap belt 93 reaches its own operative position. It will be understood, however, that people vary in size, and that different people may require or prefer dissimilar position heights for shoulder belt 92 in the operative position. Therefore, to provide some variation in the operative height position of shoulder belt 92 as will be described in more detail below, the arrangement schematically illustrated in FIGS. 4 and 5 may instead be used. Note that the length of the slot 90 is greater than or equal to the maximum distance the belt 84 moves from the uppermost position of the stop 55, which can stop shoulder belt 92 in it highest position, to the operative position in which the drive belt 84 (the lap belt 93) stops.

Referring now to FIG. 4 which is a schematic representation of a portion of track 13 in another preferred embodiment in accordance with the present invention, it is observed that track 13 includes a channel 24 having overlying flanges 60a and 60b at each side thereof. In order to guide belts 92 and 93, respectively, followers 61 and 62 (forming parts of connectors 86 and 85, respectively) are coupled to belt 84 and disposed within channel 24, being held therein by flanges 60a and 60b of rail 13. Follower 61 is larger (e.g., larger diameter 61a) than follower 62 (e.g., smaller diameter 62a) to allow connector 86 of shoulder belt 92 to be stopped by stop 55 in the operative position, whereas connector 85 of lap belt 93 will not be stopped by, but will instead pass by, stop 55 in its motion toward the operative position for lap belt 93. Note that FIG. 4 does not specifically show finger 89 and nose 87 (both of which would project into the page of FIG. 4), and hole 88, although it is to be assumed that they are present as parts of connector 86, connector 85, and defined by drive belt 84, respectively. However, FIG. 4 does schematically illustrate slot 90 and catch 98.

Track 13 defines a plurality of holes 58 in wall 64a of track 13, each one of the plurality of holes 58 being adapted to receive a stop member generally designated as 56 in FIG. 4. Although only one hole is shown in FIG. 4, it is to be understood that the plurality of holes 58 are located in the interior metal strip 66 of the track 13 in fixed spatial relation to each other (e.g., each adjacent hole of the plurality of holes 58 being approximately one inch apart) in track 13 to allow easy adjustment of the height at which connector 86 is stopped by stop 55. Examination of FIG. 4 reveals that follower 61 is of such large size that it cannot pass by stop 55 which forms part of stop member 56 and is attached thereto by neck 57. Follower 61 cannot pass by stop 55 because its size (diameter 61a) is generally larger than the spacing between stop 55 and wall 64b of track 13, which is generally designated as spacing 63 in FIG. 4. The result of stopping follower 61 and connector 86 is that shoulder belt 92 will also stop generally where stop member 56 is in place as discussed above. On the other hand, follower 62 of lap belt 93 is of smaller (diameter 62a) size than follower 61 (diameter 61a) such that follower 62 can pass through spacing 63 and pass by stop 55 within channel 24 of track 13 even though stop member 56 is in place. Follower 62 will, therefore, pass by both stop member 56 and attached stop 55, and continue to move until the restraining or operative position of lap belt 93 is reached.

Those skilled in the art will readily devise numerous arrangements to fix stop member 56 in place on track 13.

Therefore, the simple and effective arrangement that is schematically shown in FIGS. 4 and 5 should not be considered a limiting arrangement or embodiment regarding the scope of the present invention. However, referring to the particular embodiment schematically illustrated in FIG. 5, holes 58 are schematically depicted in the general shape of keyholes. Stop member 56 includes stop 55, handle portion 56a and neck 57 as already discussed, wherein neck 57 has a dimension generally smaller than stop 55. Thus, stop 55 is smaller than, and can be inserted into, the larger portion of hole 58 schematically shown in FIG. 5, and then stop member 56 can be moved down from the point of view shown in FIG. 5 so that neck 57 is received by smaller portion 59 of hole 58, which is apparent from the views depicted in FIGS. 4 and 5 taken in conjunction. Stop member 56 may now also be locked in position by the combined action of a retractor 27 (shown in FIGS. 6a and 6b, but not in FIG. 1) of belt 92 which retracts or pulls an end 12b (FIG. 1, 6a, and 6b) of belt 92 closest to retractor 27 with stop 55 positioned in smaller portion 59 of one hole of the plurality of holes 58 and being brought to bear against the edge 58a thereof by the retraction of belt 92 or by any other means known to one of ordinary skill in the art. Handle portion 56a of stop member 56 having generally a larger size than hole 58, as is apparent from FIG. 4, will prevent movement of stop member 56 inward toward track 13, while stop 55, also having generally a larger size than hole 58, will prevent outward movement of stop member 56 away from track 13, thereby substantially holding stop member 56 in place on track 13.

As already discussed above, people vary in size, and as a result, they may prefer to be able to position the height of stop 55 and thereby position the height of connector 86 of belt 92 in its operative position for their comfort. To this end, in a preferred embodiment in accordance with the present invention, the plurality of holes 58 is provided in wall 64a of track 13 which are spaced perhaps approximately one inch apart. The occupant of the vehicle seat may simply remove stop member 56 from one of the plurality of holes 58 in track 13 at one height along door post 17 and reposition it in another one of the plurality of holes 58 at a different height along door post 17 in accordance with his or her preference. The above embodiment is only one simple workable arrangement for providing height adjustment of belt 92 in track 13 and for locking stop member 56 for the comfort of the seat occupant. Although only this embodiment has been disclosed, it should be understood that numerous and additional embodiments for adjusting the height of shoulder belt 92 with belt stop member 56, and for locking belt 92 in its operative position, may occur to those of ordinary skill in the art without departing from the scope and spirit of the present invention and, thus, the disclosed embodiment is not meant to overly limit the scope of the present invention.

Figure 6A:
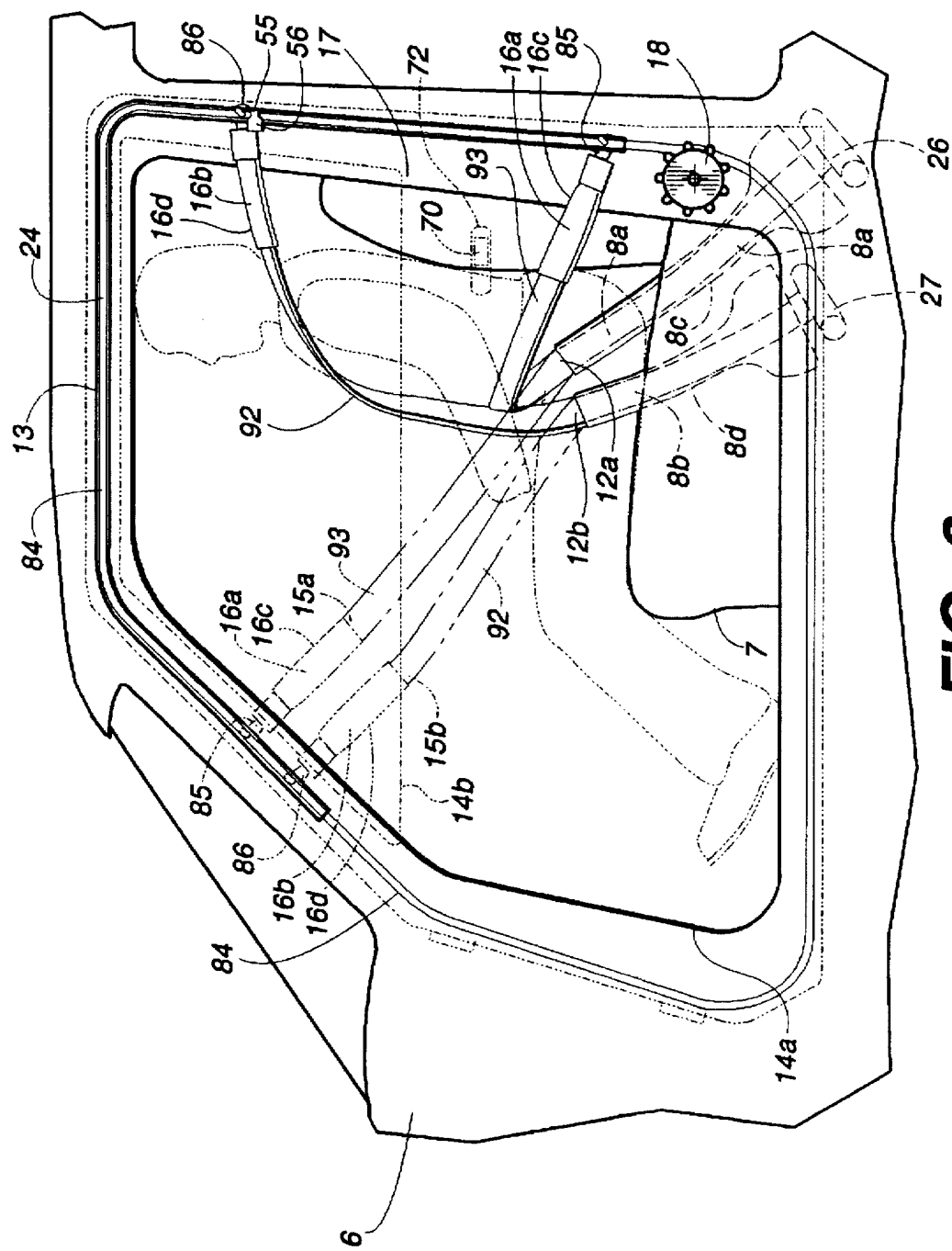
FIG. 6a is a more detailed view compared to FIG. 1 which schematically shows sheathed ends of the motorized bi-level safety belts in a preferred embodiment in accordance with the present invention.

Reference is now made to FIG. 6a, which schematically illustrates a preferred embodiment in accordance with the present invention. FIG. 6a, which shows more detail than FIG. 1, is a schematic side view of the doorway 14a of the vehicle 6 with a seat occupant sitting in the seat 7. The lap belt 93 and the shoulder belt 92 are shown in both their respective inoperative (forward) and operative (rearward) positions. A sleeve 8a having an edge 8c and a sleeve 8b having an edge 8d are shown sheathing a lower end 12a and the lower end 12b of the lap belt 93 and the shoulder belt 92, respectively. A retractor 26 and the retractor 27 for coiling up the belts 93 and 92, respectively, are depicted in FIG. 6a to be proximate the sleeves 8a and 8b at the lower ends of the sleeves 8a and 8b. Upper ends 15a and 15b of the belts 93 and 92 are sheathed within corresponding sleeves 16a and 16b. Moreover, the extreme upper portions of the upper ends 15a and 15b of the belts 93 and 92 are fastened (not shown in detail in FIG. 6a, but see FIGS. 1–4) to respective connectors 85 and 86.

In FIG. 6a, the connectors 85 and 86 pass through the channel 24 of the single track 13 and are trammeled in the track 13 as discussed above. The portion of the drive belt 84 that is located within the track 13 is accessed through the channel 24 of the track 13 for engagement by the fingers 87 and 89 (not shown in FIG. 6a, but see FIG. 4) of the connectors 85 and 86, respectively, as previously discussed with reference to FIG. 2. The finger 87 engages the drive belt 84 in the hole 88, while the finger 89 is engaged and apprehended by the catch 98 located at the rearward end of the slot 90 proximate to the hole 88 in the drive belt 84. Note that the portion of the drive belt 84 that is within the track 13 always includes the hole 88 and the slot 90. Also schematically depicted in FIG. 6a is the sprocket 18 which is motor driven to drive the drive belt 84 to reversibly position the lap 93 and shoulder 92 belts between respective inoperative and operative positions as described in detail herein. Note that, in FIG. 6a, the lower ends 12a and 12b of the belts 93 and 92, the sleeves 8a and 8b, and the retractors 26 and 27 are positioned generally at a center portion of the seat 7 and proximate a floor of the vehicle 6 away from the doorway 14a and the door 14b of the vehicle 6, and toward the interior of the vehicle 6. However, in FIG. 6a, the upper ends 15a and 15b of the belts 93 and 92, the sleeves 16a and 16b, the connectors 85 and 86, the track 13, the drive belt 84, and the sprocket 18 are positioned proximate the doorway 14a and the door 14b of the vehicle 6 generally toward the outside of the vehicle 6.

Figure 6B:
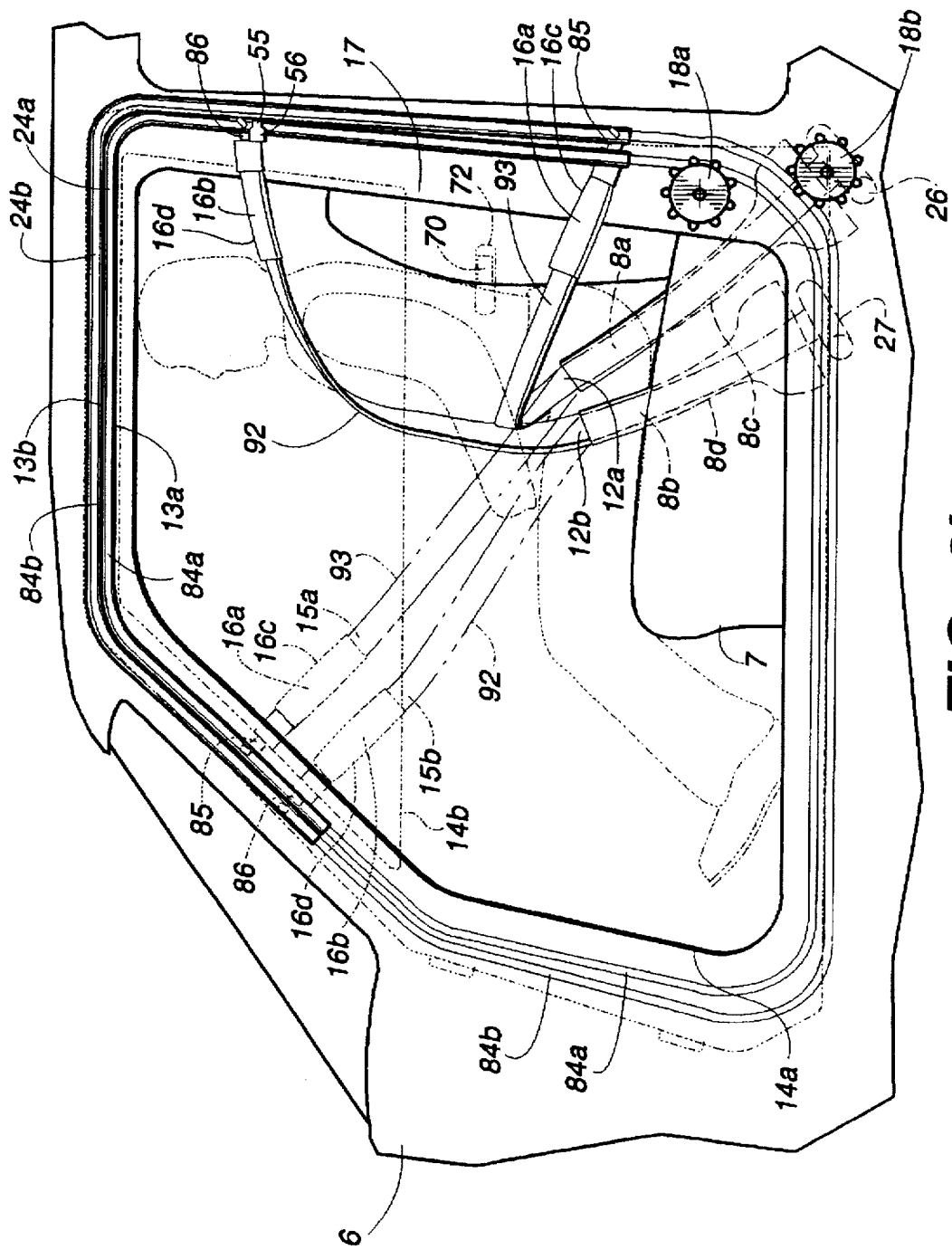
FIG. 6b schematically illustrates motorized bi-level safety belts which are connected to corresponding drive belts through corresponding tracks in accordance with an alternative embodiment of the invention.

Reference is now made to FIG. 6b, which schematically shows an alternative preferred embodiment in accordance with the present invention. The embodiment of FIG. 6b features some differences compared to the preferred embodiment of FIG. 6a. These differences include, at least, two tracks, i.e., tracks 13a and 13b, instead of the single track 13, each of the tracks 13a and 13b having associated therewith channels 24a and 24b, drive belts 84a and 84b, and motor driven sprockets 18a and 18b, respectively. The two tracks 13a and 13b, the drive belts 84a and 84b, and the sprockets 18a and 18b of FIG. 6b are similar to, and function similarly to, the single track 13, the drive belt 84, and the sprocket 18, respectively, of FIG. 6a as described in detail herein. The arrangement of FIG. 6b allows independent or decoupled motion (note that in still another alternative embodiment, allows, at least indirectly, coupled motion) of the lap belt 93 and shoulder belt 92 between their respective inoperative and operative positions. In a more preferred alternative embodiment, an arrangement (for FIG. 6b), similar to the hole 88 and finger 87 configuration schematically depicted in FIG. 3, is used for both of the fingers 89 and 87 of the belts 92 and 93 to reversibly drive the lap belt 93 and the shoulder belt 92 between their operative positions in accordance with the driven motion of the drive belts 84a and 84b, respectively.

It will therefore be seen that the present invention provides a superior restraining safety belt system for a vehicle, the restraining system including both a shoulder belt and a lap belt, both being automatically placed in respective operative or restraining positions when the vehicle ignition is turned on, and both being automatically retracted to the respective releasing or inoperative positions when the vehicle ignition is turned off. The system of the present invention is compatible with existing vehicle systems, so little modification will be required. The seat passenger may simply position his or her arm above the lap belt 93 when it moves into the operative position.

Another embodiment in accordance with the present invention is now described which allows voluntary retraction of the motorized lap 93 and shoulder 92 belts, and which at the same time prevents the safety belts from being involuntarily retracted to inoperative positions in the event of an accident occurring which causes the door 14b to be fully or partially opened, or removed. In this embodiment, a manual switch 70 (FIGS. 1 and 9) must be operated by moving a door handle 72 and a switch 78 in the vehicle door 14b, which is similar to current safety belt system (doorway) switches that activate shoulder belts, must be activated to retract the belts 92 and 93. The switch 70 is located proximate, and mechanically coupled to (although electrical coupling is conceivable in alternative embodiments to accomplish the same task) the door handle 72 of door 14b, as would be understood by one of average skill in the art. The switch 78 is controlled (activated) either by opening door 14b with door handle 72 or by operation of the switch 70. In other words, operating the switch 70 automatically activates the switch 78 as well. Note that it is not necessary that the door 14b be opened in the process of operating the door handle 72 to activate both the switches 70 and 78, and just moving the door handle 72 a small amount (without opening the door 14b) is sufficient for this activation to occur. However, when the door 14b is opened with the door handle 72, both of the switches 70 and 78 are always activated. Thus, it is the combined action of both the switches 70 and 78 which is required to retract the safety belts 92 and 93 to their respective inoperative positions, whether or not the door 14b is opened, but if the door 14b is opened in an accident, the safety belts 92 and 93 will not be retracted.

In other embodiments, the switch 70 is located in the door post 17 instead of proximate the door handle 72. In these other embodiments, the switch 78 can be activated by opening the door 14b with the door handle 72, but manually operating (toggling) the switch 70 in the door post 17 is also required to retract the belts 92 and 93. Alternatively, in these other embodiments, if it is desirable for the belts 92 and 93 to be retracted while the door 14b is closed, since the switch 70 in the door post 17 also activates the switch 78, the action of toggling the switch 70 will retract the belts 92 and 93. Note that, in addition to the above embodiments, there are yet other embodiments which have two switches like the switch 70 with one of the two switches located proximate the door handle 72 and the other of the two switches located in the door post 17, whereby vehicle seat 7 occupants are afforded convenience in retracting the belts 92 and 93 by using either of the two switches. Additional embodiments have switch 70 located elsewhere in the vehicle 6, but which perform the identical functions as described above. Thus, in all of the above embodiments, the switch 70 allows the seat occupant to voluntarily retract the shoulder belt 92 and lap belt 93 to their respective, as already discussed, inoperative positions, whether or not the door 14b nearest the seat occupant is opened. Also, note that in all the above embodiments, in the event the vehicle 6 ignition is turned off after being on, and the door 14b is opened with the door handle 72, then the switch 78 will be activated and the belts 92 and 93 will be retracted. The control of the motion of the belts 92 and 93 will be discussed in greater detail below in reference to FIG. 9.

Different embodiments in accordance with the present invention are now discussed in more detail which should help with seat belt wearing compliance while also providing for the comfort of a vehicle seat 7 occupant. In these embodiments, ends 12a and 12b (see FIGS. 1, 6a, 6b, 7a, and 7b), respectively, of motorized seat belts 93 and 92, which are proximate the seat belt retractors 26 and 27 (FIGS. 7a, 7b, and 7c), are held out and away from the body of the vehicle seat occupant when belts 93 and 92 are not in their operative positions.

In these embodiments, the ends 12a and 12b of the safety belts 93 and 92, respectively, are located or sheathed within curved sleeves 8a and 8b (FIGS. 6a, 6b, 7a, and 7b, but not shown in FIG. 1), respectively. As discussed above, the sleeves 8a and 8b are located proximate where belts 93 and 92 go into respective coils or retractors 26 or 27 (FIGS. 6a, 6b, 7a, and 7b, but not shown in FIG. 1 ) in an area near a central portion of the vehicle 6 adjacent the front seat 7 seat cushions. Retractors 26 and 27 are located generally at an inside portion of seat 7 and the floor of vehicle 6 on the side of the occupant of vehicle seat 7 distal from (i.e., not near) door 14b and doorway 14a of vehicle 6 as schematically illustrated in FIGS. 6a and 6b. The curved sleeves 8a and 8b hold the ends 12a and 12b of safety belts 93 and 92, respectively, out in front and away from the body of the vehicle seat occupant when belts 93 and 92 move into and out of their operative positions, as will be described in more detail below. Holding the ends 12a and 12b of the safety belts 93 and 92 out in front and away from the body of the vehicle seat 7 occupant makes the motorized safety belts 93 and 92 more comfortable and acceptable to the occupant. Note that in a more preferred embodiment, sleeves 8a and 8b are constructed of semi-rigid plastic and are soft.

Also, in these embodiments, which are schematically portrayed in FIGS. 1, 6a, 6b, 7a, and 7b, ends 15a and 15b of belts 93 and 92, respectively, just like the ends 12a and 12b, are located or sheathed within the curved sleeves 16a and 16b, respectively. Similar to sleeves 8a and 8b in the above more preferred embodiment, the sleeves 16a and 16b are made of semi-rigid plastic and are soft. In an alternative embodiment, edges 16c and 16d, respectively, of sleeves 16a and 16b are soft. In yet another embodiment in accordance with the present invention, the ends 15a and 15b of lap belt 93 and shoulder belt 92, respectively, which are located proximate door 14b and doorway 14a, are semi-rigid (with soft edges) themselves and do not have sleeves 16a and 16b, respectively. These latter embodiments, by design, allow the ends 15a and 15b of belts 93 and 92 to be held out and away from the body of the seat 7 occupant as belts 93 and 92 move into and out of their operative positions (and wide surfaces of the ends 15a and 15b of belts 93 and 92 turn upward as these belts move into their respective operative positions).

Figure 7A:
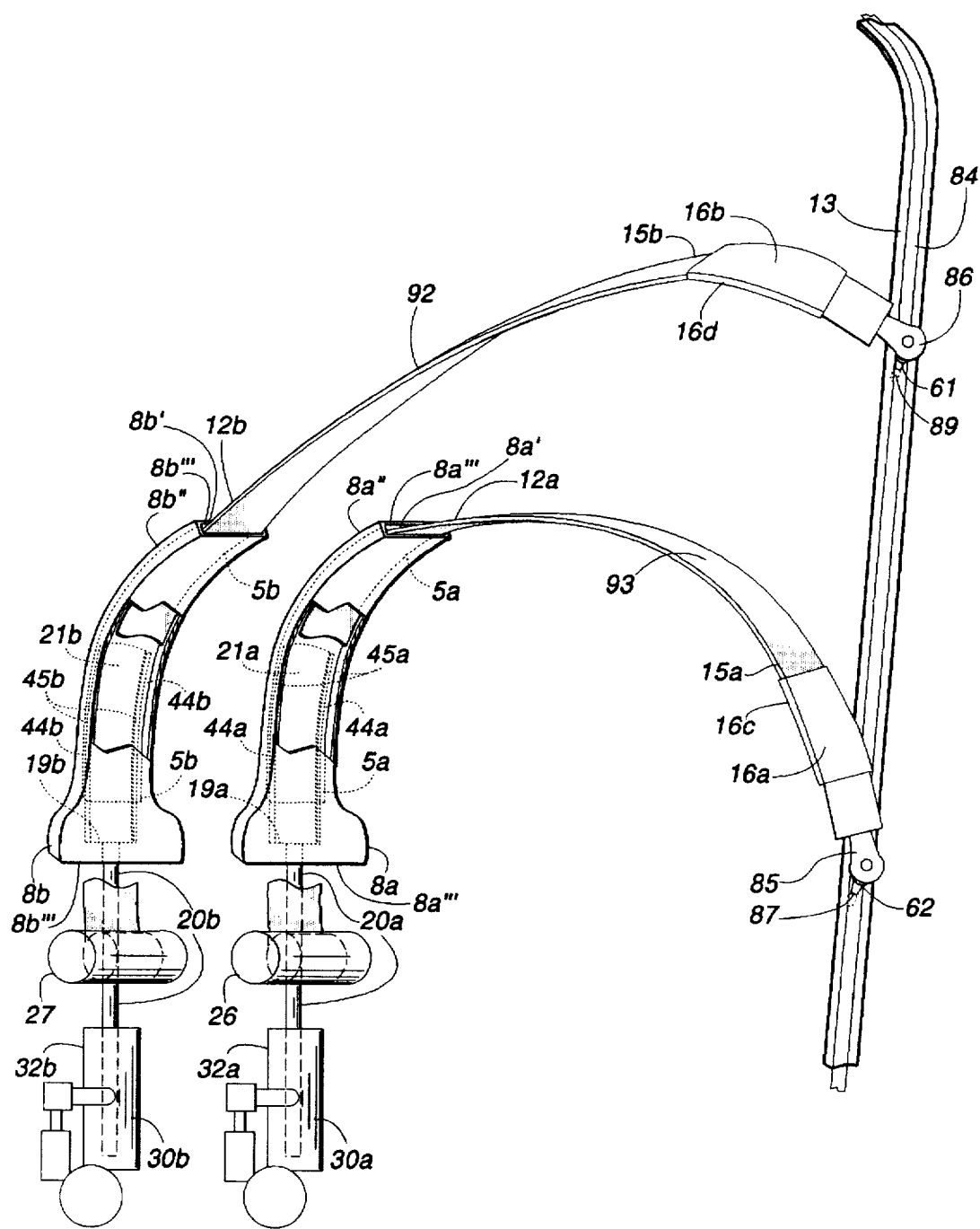
FIG. 7a schematically shows in more detail a lap and a shoulder belt in their operative positions with their respective sheathed ends, distal from (i.e., not near) a vehicle door, conforming to the body of a vehicle seat occupant along with an arrangement for positioning the sheathed ends out and away from the body of the seat occupant in the preferred embodiment (FIG. 6a) in accordance with the present invention.
Figure 7B:
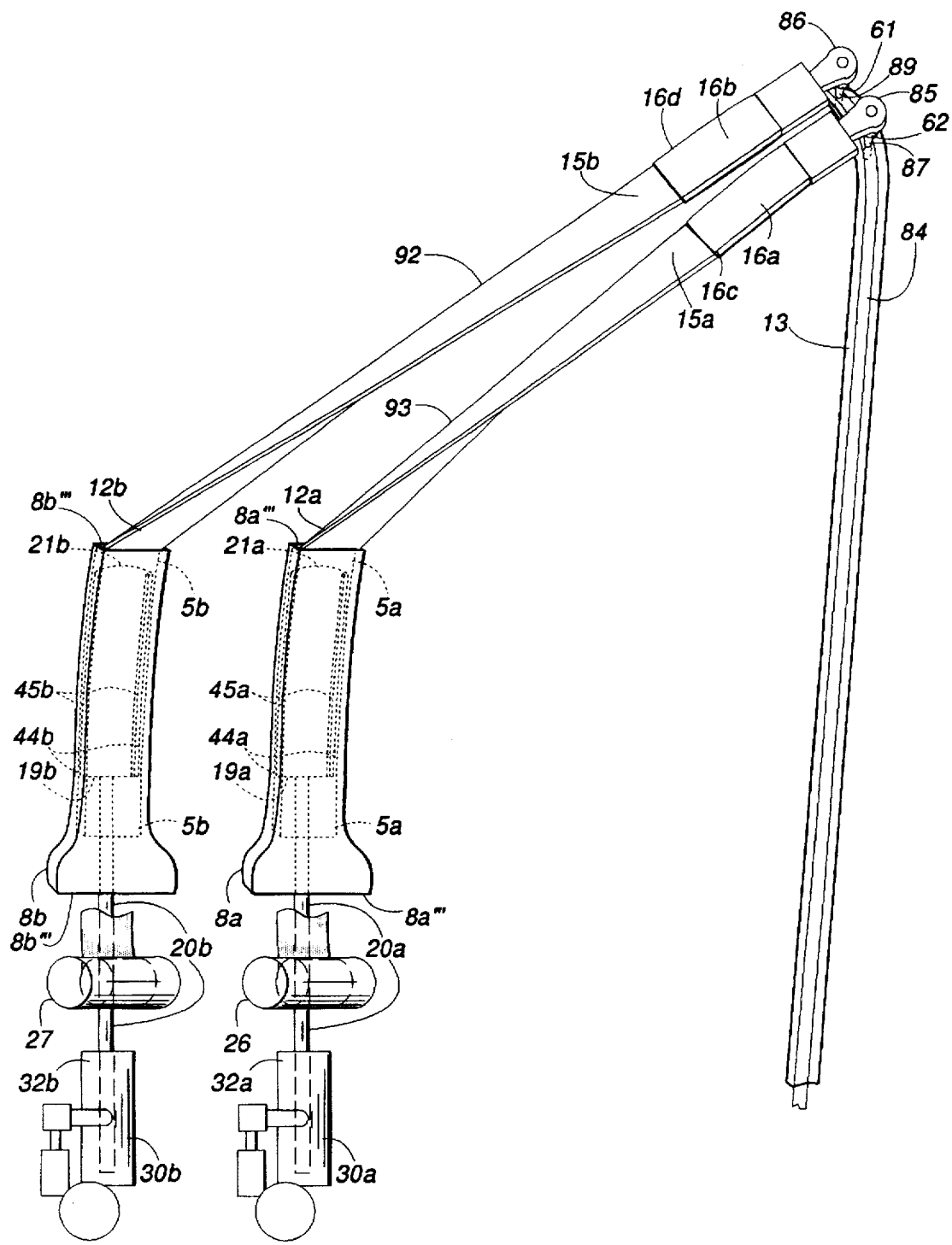
FIG. 7b schematically shows in more detail a lap and a shoulder belt in their inoperative positions with their respective sheathed ends, which are distal from (i.e., not near) a vehicle door, moved out and away from the body of a vehicle seat occupant in the preferred embodiment (FIG. 6a) in accordance with the present invention.

Reference is now made to FIGS. 7a–7e which schematically illustrate one of the preferred embodiments in accordance with the present invention. In FIG. 7a and 7b, the sleeves 8a and 8b include insert sleeves 5a and 5b attached to interior surfaces 8a' and 8b' of the sleeves 8a and 8b, respectively. As schematically shown in FIG. 7a, insert sleeves 5a and 5b are attached to interior surfaces 8a' and 8b' substantially along the full length of sleeves 8a and 8b. In one embodiment, insert sleeves 5a and 5b are glued to respective interior surfaces 8a' and 8b'. In an alternative embodiment, sleeves 5a and 5b are integral with respective interior surfaces 8a' and 8b' and sleeves 8a and 8b. Other possible embodiments for attaching insert sleeves 5a and 5b to sleeves 8a and 8b will be discussed below.

In the embodiment schematically depicted in FIGS. 7a–7d, arms 20a and 20b are flexibly coupled to rigid inserts 21a and 21b (in other embodiments it is understood by those skilled in the art that inserts 21a and 21b are semi-rigid) proximate lower ends 19a and 19b, respectively, of inserts 21a and 21b which are located inside or within the sleeves 8a and 8b. In addition, the inserts 21a and 21b are slideably coupled to the insert sleeves 5a and 5b (FIGS. 7a–7e), respectively. Examples of flexible couplers used to flexibly couple arms 20a and 20b to inserts 21a and 21b include, but are not limited to, hinged couplers and universal joint-type couplers. Note that although not specifically shown in FIG. 7d, it is to be understood that arms 20a and 20b are flexibly coupled to inserts 21a and 21b proximate lower ends 19a and 19b of inserts 21a and 21b.

In the preferred embodiment of FIGS. 7a–7e, portions of the lap belt 93 and the shoulder belt 92 are also sheathed within the sleeves 8a and 8b along with the insert sleeves 5a and 5b, respectively. Portions of the belts 93 and 92 are sheathed within and pass within the sleeves 8a and 8b through openings 8a''' and 8b''' (see FIGS. 7a, 7b, and 7d), which are defined by the interior surfaces 8a' and 8b' of the sleeves 8a and 8b and by the sleeves 5a and 5b (i.e., in the preferred embodiment and other embodiments where the sleeves 5a and 5b are attached to, or integral with, the interior surfaces 8a' and 8b'). In this preferred embodiment, the openings 8a''' and 8b''', through which the portions of the belts 93 and 92 pass for sheathing by the sleeves 8a and 8b, are located more proximate (closer to) the body of the vehicle seat 7 occupant than are the sleeves 5a and 5b. The sheathed portions of the belts 93 and 92 move freely alongside the sleeves 5a and 5b as the belts 93 and 92 move into or out of the retractors 26 and 27 when adjusted by the seat 7 occupant, or when the belts 93 and 92 transition between their operative and inoperative positions. Also, as long as the sheathed portions of the belts 93 and 92 move freely as above, it makes no difference as to the exact relative in relation to the openings 8a''' and 8b''' in relation to the sleeves 5a and 5b within the sleeves 8a and 8b. However, note that in an alternative embodiment, the openings 8a''' and 8b''' are located more distal (i.e., further away) from the body of the seat 7 occupant than are the sleeves 5a and 5b. In other words, in this latter embodiment, the sleeves 5a and 5b are located closer to the body of the seat 7 occupant within the sleeves 8a and 8b than are the openings 8a''' and 8b''', respectively.

In other alternative embodiments, the insert sleeves 5a and 5b are instead attached to exterior surfaces 8a'' and 8b'' (surfaces 8a'' and 8b'' are identified in FIG. 7a) of the sleeves 8a and 8b, respectively, and arms 20a and 20b are flexibly coupled to the inserts 21a and 21b at the ends 19a and 19b, but outside of sleeves 8a and 8b. In one of these other alternative embodiments, the sleeves 5a and 5b are more distal from (i.e., not as near) the body of the seat occupant compared to the openings 8a''' and 8b''' through which the belts 93 and 92 are sheathed by the sleeves 8a and 8b, while the reverse is true for another of these other alternative embodiments. Note that in these latter other alternative embodiments, the openings 8a''' and 8b''' are now defined only by the interior surfaces 8a' and 8b' since the sleeves 5a and 5b are attached to the exterior surfaces 8a'' and 8b'' of sleeves 8a and 8b.

Note that whether insert sleeves 5a and 5b are attached to the interior surfaces 8a' and 8b' or to the exterior surfaces 8a'' and 8b'' of the sleeves 8a and 8b, and whether the openings 8a''' and 8b''' are more distal (i.e., not as near) or more proximate to the body of the seat occupant compared to the sleeves 5a and 5b, the arms 20a and 20b along with the inserts 21a and 21b work together with the motors 30a and 30b, the sleeves 8a and 8b, the belts 93 and 92, and the rest of the safety belt system to perform the same functions being described herein. For either of these embodiments, the discussions below with regard to curvatures and materials apply equally, and the operations of these embodiments being described herein are similar to each other.

In the preferred embodiment shown in FIG. 7a, which displays the lap belt 93 and shoulder belt 92 in their respective operative positions, movable arms 20a and 20b reversibly extend from motors 30a and 30b and are flexibly coupled to inserts 21a and 21b inside sleeves 8a and 8b, respectively. In a more preferred embodiment in accordance with the present invention, arms 20a and 20b are telescopic, extending or retracting in segments as they are moved by motors 30a and 30b, which are antenna-type motors. An example of an antenna-type motor is the telescoping model MQB-2 Ebony Power Antennas made by Harada Industry of America, Southfield, Mich. 48034, or any equivalent thereof. However, it should be understood that types of motors other than antenna-type motors may be used instead for motors 30a and 30b as would be known to those of ordinary skill in the art. Note that motors 30a and 30b are suitably positioned under seat 7 or between and under vehicle seat cushions comprising seat 7 near sleeves 8a and 8b to facilitate the flexible coupling between arms 20a, 20b and inserts 21a, 21b, respectively. Note also that in another embodiment in accordance with the present invention, arms 20a and 20b extend from and retract into housings 32a and 32b (see FIGS. 7a and 7c) which house motors 30a and 30b, respectively.

Because sleeves 8a and 8b are constructed of semi-rigid plastic in a more preferred embodiment, if there is slack (i.e., low tension) in belts 93 and 92 (e.g., when the belts 93 and 92 are in their inoperative positions), then belts 93 and 92 do not pull sleeves 8a and 8b partially around the body of the vehicle seat 7 occupant and sleeves 8a and 8b tend to be naturally positioned out in front of and away from the vehicle seat 7 occupant. However, when the belts 93 and 92 tighten (i.e., with high tension) in their operative positions around the body of the occupant, the tension of the belts 93 and 92 tends to pull sleeves 8a and 8b to conform more to the portion of the body of the occupant proximate sleeves 8a and 8b. In another more preferred embodiment, edges 8c and 8d (see FIGS. 6a and 6b), respectively, of sleeves 8a and 8b are also soft.

Figure 7C:
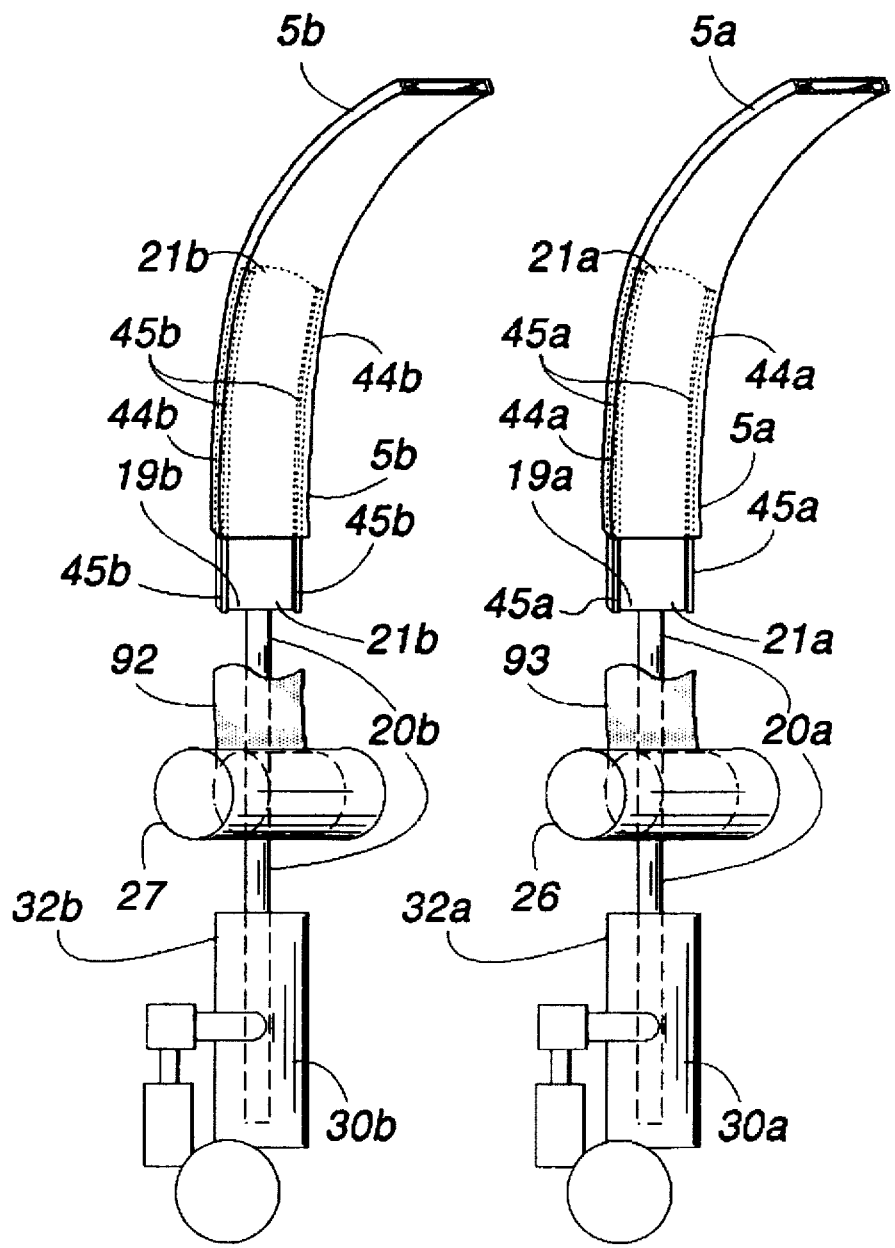
FIG. 7c schematically illustrates in more detail a portion of FIG. 7a showing an insert within an insert sleeve which is positioned therein by a flexibly coupled arm, thereby positioning a sleeve affixed to the insert sleeve to hold a seat belt out in front of, and away from, a vehicle seat occupant.

As schematically indicated in FIG. 7a, sleeves 8a and 8b are also curved or arcuate along their length in order to better conform to the body of the vehicle seat occupant when belts 93 and 92, which are sheathed by sleeves 8a and 8b in the preferred embodiment, respectively, move into their respective operative positions. Moreover, as schematically shown in FIGS. 7a, 7c, and 7d, insert sleeves 5a and 5b further define opposed guide channels 44a and 44b, respectively, which are curved or arcuate (i.e., the opposed edges of sleeves 5a and 5b which define guide channels 44a and 44b are curved or arcuate) in accordance with the curvature of sleeves 8a and 8b, respectively. Rails 45a and 45b, which are defined by the opposed edges of inserts 21a and 21b, respectively, fit into and are slideably coupled within guide channels 44a and 44b, respectively, as schematically shown in FIGS. 7a–7e and slide substantially along the entire length of guide channels 44a and 44b as described below. Rails 45a and 45b are guided by channels 44a and 44b as inserts 21a and 21b move away from or toward the respective ends of sleeves 8a and 8b (i.e., away from or toward motors 30a and 30b) in accordance with the extension and retraction of arms 20a and 20b upon activation of motors 30a and 30b when belts 93 and 92 move between respective operative and inoperative positions. Note that rails 45a and 45b are curved or arcuate along the length of inserts 21a and 21b within sleeves 5a and 5b in similarity to channels 44a and 44b of sleeves 5a and 5b. However, the curvatures of the rails 45a and 45b are purposely designed to be less than the curvatures of guide channels 44a and 44b as will be discussed below in more detail.

With reference to FIGS. 7a–7e, discussion now proceeds with a description of the functionality and operation of the present invention. Note that the preferred embodiment schematically shown in FIGS. 7a–7e facilitates reversibly moving sleeves 8a and 8b out and away from a vehicle seat 7 occupant for the comfort of the occupant as belts 93 and 92 move into and out of their respective operative positions. Arms 20a and 20b act in reversible movable cooperation with inserts 21a and 21b to reversibly hold sleeves 8a and 8b out in front of and away from the body of the vehicle seat occupant either when safety belts 93 and 92 move between their respective inoperative (body release) and operative (body restraint) positions (i.e., whenever belts 93 and 92 are in motion), or when safety belts 93 and 92 are in their inoperative positions as will be discussed in greater detail below.

Whenever safety belts 93 and 92 move between their operative positions (e.g., when a seat 7 occupant pulls the door handle 72 and the vehicle ignition is turned on) and inoperative positions, motors 30a and 30b are activated to extend arms 20a and 20b several inches which moves rigid (described below) inserts 21a and 21b away from motors 30a and 30b, thereby holding sleeves 8a and 8b out and away from the occupant because of the relative curvatures and material rigidity (discussed below) of inserts 21a and 21b (and rails 45a and 45b), and guide channels 44a and 44b. In an embodiment in accordance with the present invention, the full extension of arms 20a and 20b by the antenna-type motors 30a and 30b is over a range of approximately 4 to 10 inches or more. In a more preferred embodiment, the full extension of arms 20a and 20b by the antenna-type motors 30a and 30b is approximately 8 inches or more. The mechanism for this motion in the preferred embodiment is now further discussed with specific reference to FIGS. 7a, 7b, and 7c.

Inserts 21a and 21b (and rails 45a and 45b) are intentionally constructed with a more rigid material than material used to construct both sleeves 8a and 8b. In fact, the material used to construct sleeves 8a and 8b is flexible enough to conform to the body of the vehicle seat 7 occupant when belts 93 and 92 are in their respective operative positions and tension is applied to belts 93 and 92. In addition, somewhat less than half the lengths (in some embodiments, an inch or two or less than half the lengths) of insert sleeves 5a and 5b (and guide channels 44a and 44b) located most distal (i.e., furthest) from arms 20a and 20b are constructed with a less rigid material than inserts 21a and 21b. Correspondingly, somewhat more than half the lengths (in some embodiments, an inch or two or more than half the lengths) of insert sleeves 5a and 5b (and guide channels 44a and 44b) located most proximate arms 20a and 20b are constructed with a material at least as rigid as the material with which inserts 21a and 21b are constructed. In preferred embodiments, and without limitation, the total lengths of sleeves 5a and 5b from ends of sleeves 5a and 5b proximate arms 20a and 20b to ends of sleeves 5a and 5b most distal (i.e., furthest) from arms 20a and 20b (as viewed in FIG. 7a), range, for example, over approximately 10 to 24 inches. Also, in these preferred embodiments, and without limitation, the somewhat more than half the lengths of insert sleeves 5a and 5b proximate arms 20a and 20b and the inserts 21a and 21b have lengths that range, for example, over approximately 6 to 23 inches. Whatever the above lengths, in any one of these preferred embodiments, the lengths of inserts 21a and 21b are greater than half the total lengths of sleeves 5a and 5b, respectively, and the lengths of the somewhat more than half lengths of insert sleeves 5a and 5b are approximately equal to the lengths of inserts 21a and 21b as discussed in more detail below. Note that in more preferred embodiments, and without limitation, the above ranges, for example, are approximately 12 to 20 inches, approximately 7 to 16 inches, and approximately 7 to 16 inches, respectively.

When belts 93 and 92 are about to move from their respective operative to inoperative positions (e.g., when the vehicle seat 7 occupant pulls the door handle 72 and the ignition is turned off), motors 30a and 30b are activated to extend arms 20a and 20b to push inserts 21a and 21b within sleeves 5a and 5b further away from motors 30a and 30b until inserts 21a and 21b reach their end of motion position at the extreme extent from motors 30a and 30b of sleeves 5a and 5b. Because the lengths of the more rigid portions (somewhat more than half the lengths as above) of the sleeves 5a and 5b are approximately equal to the lengths of inserts 21a and 21b, and because the latter lengths are greater than half the total lengths of sleeves 5a and 5b, then when inserts 21a and 21b reach the furthest extent of their motion away from the motors 30a and 30b, some shorter portions of inserts 21a and 21b will still overlap the rigid portions of sleeves 5a and 5b. This arrangement maintains the overlap of the rigid portions of sleeves 5a and 5b with rigid inserts 21a and 21b to further provide support of the sleeves 8a and 8b and prevents (or diminishes the likelihood of) toppling over of the sleeves 8a and 8b in the lap of the seat 7 occupant in the event tension is applied to the belts 93 and 92 when these belts are not in their operative positions.

The less severe curvatures, referred to above, of rails 45a and 45b (inserts 21a and 21b) compared to guide channels 44a and 44b (sleeves 5a and 5b), in addition to the relative rigidity of materials, also plays a role in the disposition of the sleeves 8a and 8b about the seat 7 occupant and is intentional. The reduced curvatures and greater material rigidity (stiffness) of rails 45a and 45b compared to guide channels 44a and 44b (and sleeves 8a and 8b) combine to force insert sleeves 5a and 5b, and therefore, sleeves 8a and 8b (because sleeves 5a and 5b are attached to sleeves 8a and 8b), to straighten out more and approach the curvature (i.e., to exhibit the reduced curvature) of rails 45a and 45b as rails 45a and 45b (i.e., inserts 21a and 21b) are inserted further, by arms 20a and 20b, to the extreme positions of inserts 21a and 21b within sleeves 5a and 5b along guide channels 44a and 44b. The straightening out of sleeves 8a and 8b also simultaneously moves sleeves 8a and 8b (and belts 93 and 92) out and away several inches from the body of the vehicle seat 7 occupant in correspondence to the several inches of motion of arms 20a and 20b in inserting inserts 21a and 21b further within sleeves 5a and 5b.

As long as belts 93 and 92 are not in their respective operative positions (i.e., when in their inoperative positions or transitioning between their operative and inoperative positions), sleeves 8a and 8b will be maintained out and away from the body of the occupant as described for the comfort of the occupant. This is because the inserts 21a and 21b will be inserted within the sleeves 5a and 5b, respectively, and there is overlap between the rigid portions of the sleeves 5a and 5b and the inserts 21a and 21b. However, when belts 93 and 92 subsequently transition from their inoperative to their operative positions, once connectors 86 and 85 reach their stop points, motors 30a and 30b are again activated to retract arms 20a and 20b to withdraw inserts 21a and 21b from their extreme away position from motors 30a and 30b (FIG. 7b) until inserts 21a and 21b reach their extreme closest position to motors 30a and 30b (FIG. 7a) within sleeves 5a and 5b (i.e., arms 20a and 20b are fully retracted by motors 30a and 30b). During retraction of inserts 21a and 21b, the portions of sleeves 8a and 8b from which inserts 21a and 21b have been withdrawn (i.e., the inserts 21a and 21b are not extended anymore) will be pulled over by tension applied to the belts 93 and 92 in their operative positions because sleeves 8a and 8b are soft and not as rigid as inserts 21a and 21b and the rigid portions of sleeves 5a and 5b. Note that the flexible coupling between arms 20a, 20b and inserts 21a, 21b, respectively, provides relief from any relative motion there between as inserts 21a and 21b are reversibly moved within sleeves 5a and 5b. Note also that in another embodiment in accordance with the present invention, in addition to being telescopic, arms 20a and 20b are constructed of curved pieces of plastic to allow for, and ease, any relative motion between arms 20a and 20b and inserts 21a and 21b during the curving reversible motion of inserts 21a and 21b (curved rails 45a and 45b) along insert sleeves 5a and 5b (curved guide channels 44a and 44b).

Note that sleeves 8a and 8b only move out and away from the body of the vehicle seat 7 occupant when belts 93 and 92 are moving between respective operative and inoperative positions. Hence, there are no problems associated with any tension applied to the belts 93 and 92 hindering sleeves 8a and 8b from moving since these belts will have slack (less tension applied) between sleeves 8a and 8b and track 13 (FIG. 6a) or tracks 13a and 13b (FIG. 6b), as discussed above, when they are not in their operative positions. Furthermore, in another embodiment, in order to provide more slack on belts 93 and 92 while sleeves 8a and 8b move out and away from the vehicle seat 7 occupant, if necessary, sleeves 8a and 8b, which sheath these belts, ease tension on the belts 93 and 92 by pulling on these belts. In this embodiment, the pulling is made feasible by virtue of contact between the belts 93 and 92 inside the sleeves 8a and 8b, respectively, with internal surfaces 8a' and 8b', to feed some belt length from the respective retractors 26 and 27 as the sleeves 8a and 8b move out and away from the vehicle seat 7 occupant.

Sleeves 8a and 8b will remain in the pushed out and away position relative to the body of the vehicle seat 7 occupant as long as safety belts 93 and 92 are not in their respective operative positions (i.e., sleeves 8a and 8b remain out and away as described above until these belts are in their operative positions). Note that once belts 93 and 92 are back in their operative positions, and tension is applied thereto, the retraction of arms 20a and 20b moves inserts 21a and 21b back toward motors 30a and 30b, thereby allowing sleeves 8a and 8b to assume their normal curvatures again and conform to the body of the vehicle seat 7 occupant. However, whenever safety belts 93 and 92 begin to move to their respective inoperative or release positions, e.g., when the vehicle ignition is turned off after being on and the switch 78 is activated (FIG. 9), or the release switch 70 and the switch 78 are activated by the vehicle seat occupant as already described (and discussed further below), motors 30a and 30b will retract arms 20a and 20b several inches. This retraction will move inserts 21a and 21b toward motors 30a and 30b, leaving the ends of sleeves 8a and 8b, from which inserts 21a and 21b have been retracted, and which are positioned away from motors 30a and 30b, more flexible to be pulled toward the body of the vehicle seat 7 occupant by the tension applied to belts 93 and 92 in their operative positions. Note that tension is applied to belts 93 and 92 as the retractors 26 and 27 retract slack on these belts and as these belts are moved into their respective operative positions along the track 13 (FIG. 6a), or the tracks 13a and 13b (FIG. 6b), as would be understood by one of ordinary skill in the art.

The extension of arms 20a and 20b as described above will thereby prevent belt 93 from being too close to the body of the vehicle seat occupant whenever belts 93 and 92 move into or out of their operative positions. Furthermore, once arms 20a and 20b retract, enhanced restraint is provided to the seat occupant as tension is increased along belts 93 and 92 as excess slack is retracted into the retractors 26 and 27. This arrangement as discussed above will aid in providing both comfort and superior restraint to the vehicle seat occupant while also increasing seat belt wearing compliance.

In an alternative embodiment in accordance with the present invention, sleeves 8a and 8b return to their normal curvature, i.e., toward their relaxed positions, by "memory" when arms 20a and 20b have retracted inserts 21a and 21b, respectively, toward motors 30a and 30b. In this alternative embodiment, when arms 20a and 20b retract, sleeves 8a and 8b move back toward their natural and more curved positions close to the body of the seat 7 occupant and in accordance with their positioning when belt tension is applied to belts 93 and 92 in their operative positions which forces sleeves 8a and 8b to conform to the body of the vehicle seat 7 occupant.

Figure 8:
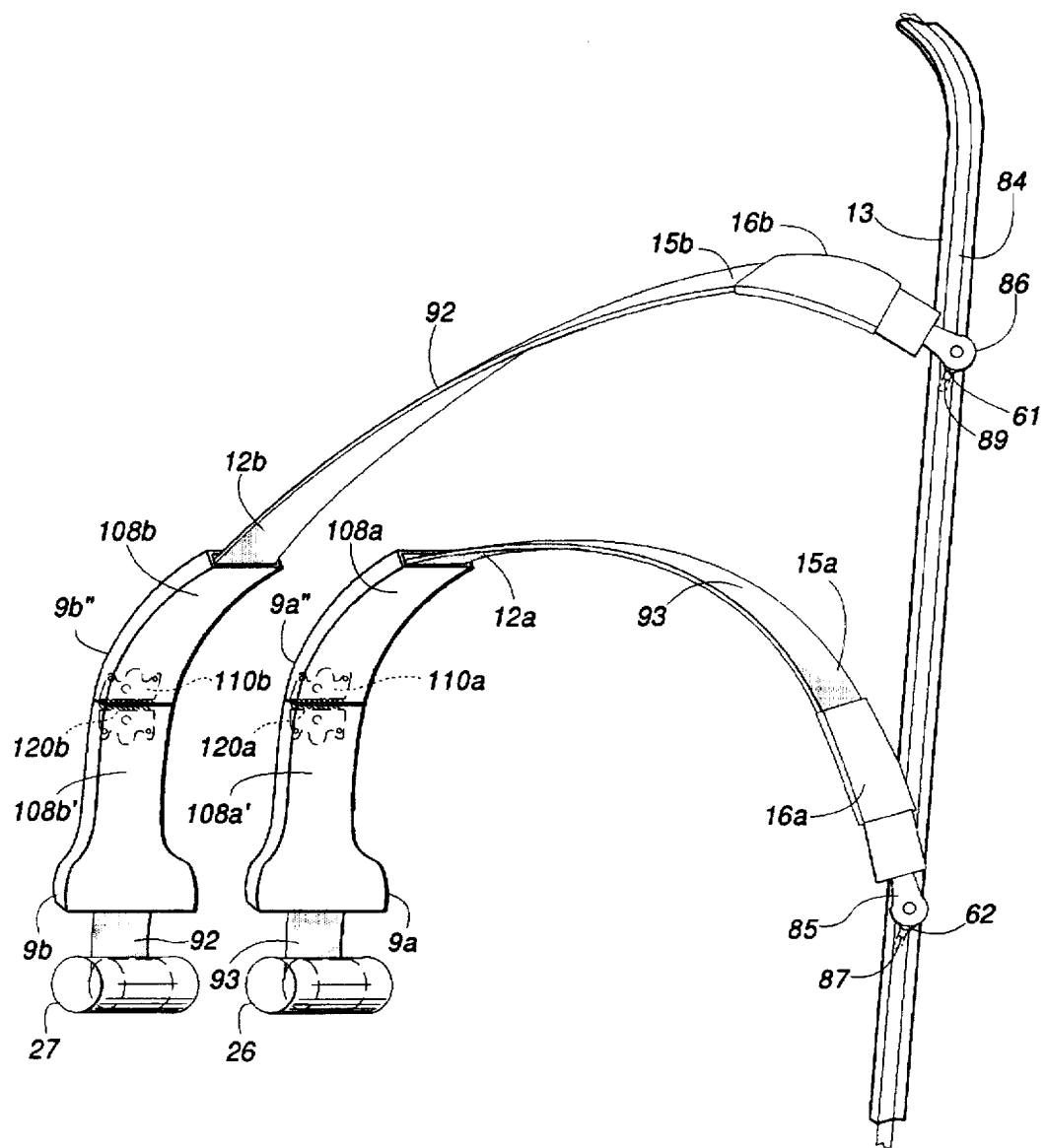
FIG. 8 schematically illustrates a hinged spring mounted to the exterior portions of sleeves sheathing a lap belt and a shoulder belt in accordance with an alternative embodiment of the present invention.

In another alternative embodiment in accordance with the present invention, distinct from the preferred embodiment of FIG. 7a–7e, which is schematically shown in FIG. 8, sleeves 9a and 9b have semi-rigid upper portions 108a and 108b and rigid lower portions 108a' and 108b' which are attached to each other. The rigid lower portions 108a' and 108b' are more proximate the retractors 26 and 27, respectively, than are the semi-rigid upper portions 108a and 108b as illustrated in FIG. 8. In this alternative embodiment, attached to the exterior portions 9a" and 9b" of the sleeves 9a and 9b, and spanning regions of attachment between the semi-rigid upper portions 108a and 108b and the rigid lower portions 108a' and 108b' of the sleeves 9a and 9b are hinges 110a and 110b combined with hinge springs 120a and 120b, respectively (note that in some embodiments, the upper portions 108a and 108b and the rigid lower portions 108a' and 108b', respectively, form integral units which are similarly spanned by the hinge 110a, 110b and hinge spring 120a, 120b combinations). The hinge springs 120a and 120b are coupled to (combined with) hinges 110a and 110b, and these hinge/hinge spring combinations are attached (mounted) to sleeves 9a and 9b (spanning regions of attachment between the semi-rigid upper portions 108a and 108b and the rigid lower portions 108a' and 108b'), so that the spring action of the hinge springs 120a and 120b force (bias), via the hinges 110a and 110b, the semi-rigid upper portions 108a and 108b (of the sleeves 9a and 9b), the lap belt 93, and the shoulder belt 92 to be held out in front of, and away from, a seat 7 occupant when the lap belt 93 and the shoulder belt 92 are not in their respective operative positions (including when these belts are in their inoperative positions). However, when the lap belt 93 and the shoulder belt 92 move into their operative positions, the tension on these belts (portions of which pass through the sleeves 9a and 9b) are sufficient to overcome the spring force of the hinge springs 120a and 120b, thereby pulling (bending) the semi-rigid upper portions 108a and 108b over toward (closer to) the seat 7 occupant's body. The upper portions 108a and 108b of the sleeves 9a and 9b will remain in this bent over position until the next time the lap belt 93 and the shoulder belt 92 move out of their operative positions, whereupon the upper portions 108a and 108b, the lap belt 93, and the shoulder belt 92 will again be held out in front of, and away from, a seat 7 occupant. In a similarly functioning alternative embodiment, the semi-rigid upper portions 108a and 108b and the rigid lower portions 108a' and 108b' of the sleeves 9a and 9b, respectively, do not have the hinge 110a, 110b and hinge spring 120a, 120b combinations attached thereto to function as described above. Instead, the semi-rigid upper portions 108a and 108b themselves have a natural spring-like force characteristic (due to their semi-rigid property and construction) which forces (biases) the lap belt 93 and the shoulder belt 92 to be held out in front of, and away from, the seat 7 occupant's body when these belts are not in their operative positions. In this latter embodiment, when these belts move into their operative position, the spring-like force characteristic is overcome by the tension in belts 93 and 92 as above.

Figure 9:
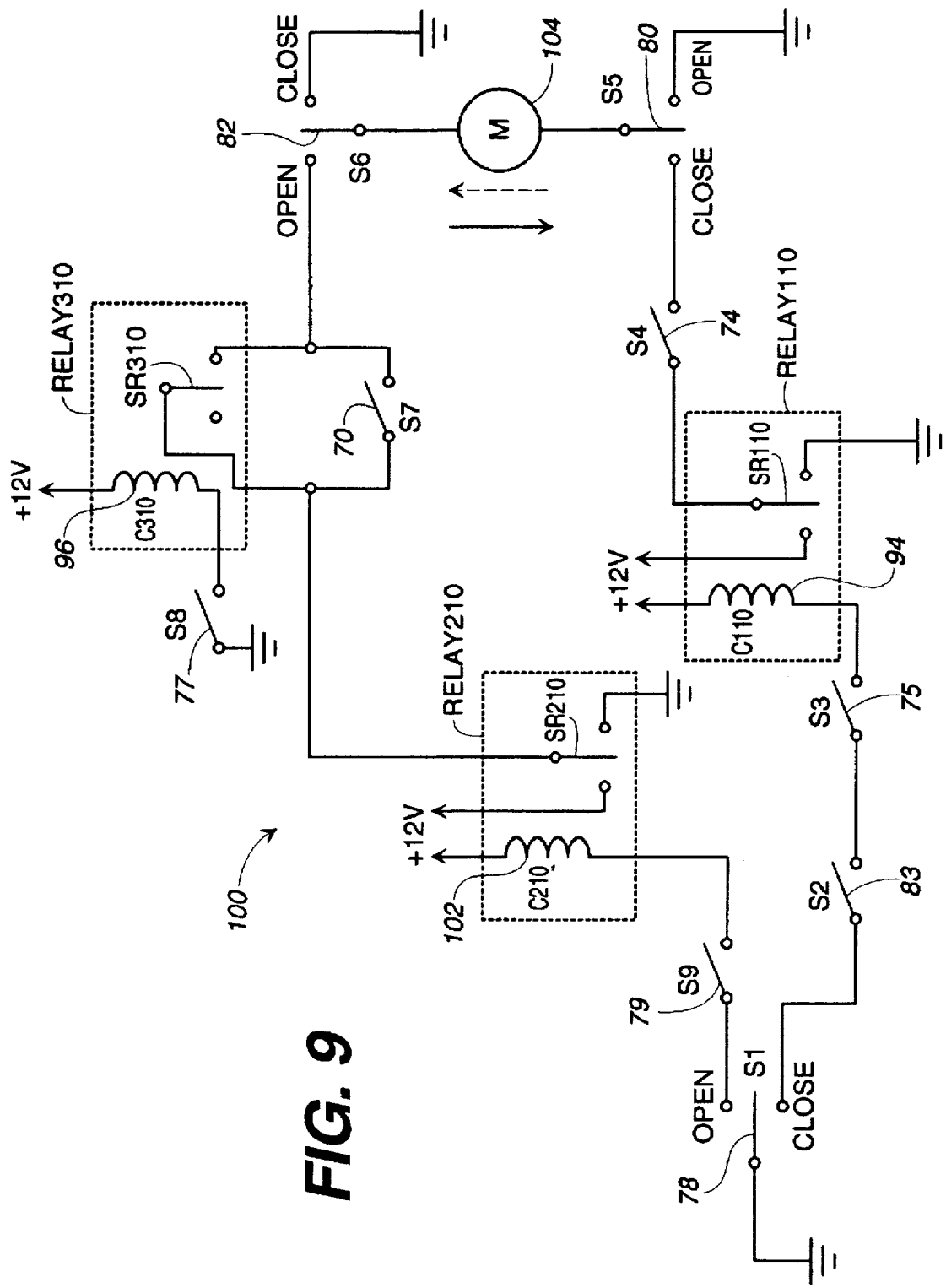
FIG. 9 is a schematic electrical diagram of a circuit which is used to control a motor which reversibly moves motorized safety belts between operative and inoperative positions.

In yet another embodiment in accordance with the present invention, a seat belt control circuit 100 and method therefor is provided. The components of circuit 100 may be located in any number of a variety of places in the vehicle 6 as would be understood by one of average skill in the art, although some particular locations have been discussed above for the switches 70 and 78. Referring now to FIG. 9, which schematically illustrates the circuit 100, the lap and shoulder belts, 93 and 92, respectively, do not move into their restraining or operative positions if the vehicle ignition is turned on and there is no occupant in the vehicle passenger seat. This avoids having a moving lap and shoulder belt when a vehicle passenger returns to get in his or her vehicle, and is accomplished by requiring activation of two switches, an electrical switch 74 (S4) located under the seat 7 and the switch 78 (S1) located in the doorway 14a, to move the belts 92 and 93 into their operative positions. Here, the electrical switch 74 (S4) is activated (to close) by the weight of a person in the vehicle 6 occupying the seat 7, and when he or she closes the door 14b, the switch 78 (S1) is also activated (see FIG. 9 and discussion below). Only activation of both the switches 74 and 78 will allow the motorized lap 93 and shoulder 92 belts to move to their respective operative positions.

Referring again to FIG. 9, the circuit 100 is used to control the motion of the belts 93 and 92 between their respective operative and inoperative positions. With an occupant seated in seat 7 and the vehicle 6 ignition turned on, in order to move the belts 93 and 92 from their respective operative to inoperative positions, either the ignition switch 77 (S8) must be turned off and the door 14b opened by pulling the door handle 72 (which activates the switch 78 to move to its "open" position), or a switch 70 (S7), located in either the door handle 72 of the door 14b, or the door post 17, or elsewhere in the door 14b or the vehicle 6 (as discussed above regarding various embodiments) must be moved or toggled. Switch 70 (S7) also controls the switch 78 (S1) independently of the door 14b opening as discussed above in order to retract the belts 92 and 93 and as will be discussed below in greater detail. Alternatively, if the door 14b is already opened from pulling the door handle 72, which moves the switch 78 (S1) to its "open" position, if the switch 70 (S7) is toggled or activated (closed), then the belts 92 and 93 retract. Note that the switch 70 (S7) not only controls the switch 78 (S1), but also moves a switch 80 (S5) to its right ("open") position and a switch 82 (S6) to its left ("open") position. Switch 70 (S7), therefore, prevents disengagement of the belts 92 and 93 from their operative positions to their inoperative positions, unless the vehicle ignition is turned off.

Now, with reference to FIG. 9, first assume that the vehicle 6 is unoccupied, the doors are closed (i.e., all vehicle 6 doors proximate safety belts of the present invention, including door 14b, are closed), and the safety belts are positioned toward the forward end 41 (FIG. 1) of track 13 (FIG. 6a) or tracks 13a and 13b (FIG. 6b) in their inoperative positions in the vehicle 6 (i.e., the belts are disengaged), then switch 78 (S1) is in the close (i.e., door 14b closed) position and switches 80 (S5) and 82 (S6) are in the left and right "close" (i.e., door 14b closed) positions, respectively. Switches 83 (S2) and 79 (S9) are closed and opened, respectively (switch 83 opens and switch 79 closes only when the belts 93 and 92 are located at the rearward portion 10b of doorway 14a near the rearward end 40 of track 13 (FIG. 6a), or tracks 13a and 13b (FIG. 6b) in the alternative embodiment, in their respective operative positions).

Now, if the door 14b is opened and the seat occupant enters the vehicle 6 (wherein indicated switches in FIG. 9 move to their respective "open", i.e., door 14b open positions), then after closing the door 14b, switch 78 (S1) moves back into the close (door 14b closed) position, and switches 80 (S5) and 82 (S6) move back to the "close" (door 14b closed) positions. Meanwhile switch 83 (S2) stays closed. Switch 74 (S4) is activated by the weight of the seat occupant, as already discussed, and closes only if the seat is occupied. Switch 75 (S3) and switch 77 (S8) are ignition switches of the vehicle 6 which are closed when the ignition key is in place and the vehicle 6 engine is ignited (i.e., the vehicle 6 ignition is turned on). Now if there is a seat 7 occupant and the ignition is turned on, then coil 94 (C110) in RELAY 110 will be excited and armature (movable lever) SR110 is pulled to its left terminal (see FIG. 9) position. Also, coil 96 (C310) in RELAY 310 will be excited which pulls armature SR310 to its left terminal (see FIG. 9) position. Then, current flows in the dashed arrow direction (FIG. 9) through a motor 104 which moves the drive belt 84 to move the safety belts 93 and 92 rearward toward their respective operative positions to hold the seat 7 occupant securely. Motor 104 turns sprocket 18 (FIG. 6a) to reversibly drive the drive belt 84 as discussed above. Note that in the alternative embodiment shown in FIG. 6b, there are two motors (not shown) which are like motor 104 in the preferred embodiment, one each for turning sprockets 18a and 18b, respectively, to move the drive belts 84a and 84b to move the belts 93 and 92, respectively. When the safety belts reach their operative positions toward the rearward end 40 of track 13 (FIG. 1), switch 79 (S9) closes and switch 83 (S2) opens. Hence, RELAY 110 is deactivated and armature SR 110 moves back to the right terminal (FIG. 9) position which stops (deactivates) motor 104. Note that activation/ deactivation of RELAY 110 or RELAY 210 (discussed below) also controls the antenna-type motors 30a and 30b (not shown in FIG. 9) to move the moving arms 20a and 20b to move the inserts 21a and 21b inside the sleeves 5a and 5b, respectively, as discussed above. Also note that in the vehicle 6, there may be pluralities of motors like motor 104, motors like motors 30a and 30b, arms like arms 20a and 20b, sleeves like sleeves 8a and 8b, and safety belts like belts 93 and 92 for a corresponding plurality of seating positions in the vehicle 6. These pluralities are used to retract (or extend as discussed below) the arms like arms 20a and 20b to allow for the sleeves like sleeves 8a and 8b to be pulled back around (or, as discussed below, pushed out and away from) occupants of the seating positions of the vehicle 6 when the motors like motor 104 stop.

Now, if it is assumed that the door 14b nearest a seat 7 occupant is closed (i.e., the belts 93 and 92 are in their respective operative positions), with switch 79 (S9) closed and with switch 83 (S2) open (FIG. 9), and the vehicle engine is returning (switches 75 (S3) and 77 (S8) are closed), then when either the door 14b is opened, or the switch 70 (S7) is closed by a vehicle 6 (or seat 7) occupant, the switches 78 (S1), 80 (S5), and 82 (S6) move to their respective "open" (door 14b open) positions. This results in excitation of coil 102 (C210) in RELAY 210 which pulls armature SR210 to its left position (FIG. 9). Note that switch 70 (S7) is the manual switch accessible by the seat occupant and switch 77 (S8) opens only when the vehicle ignition is turned off. When either switch 70 (S7) closes (the seat occupant holds or moves the switch 70 (S7)), or the vehicle ignition is turned off (which opens switch 77 (S8) and deactivates coil 96 (C310) in RELAY 310, which in turn moves armature SR310 to its right position (FIG. 9)), then current flows in the solid arrow direction through motor 104 (FIG. 9) and moves safety belts 93 and 92 forward toward their respective inoperative positions along track 13 (FIG. 6a), and motors 30a and 30b are activated (under control of RELAY 210) to extend arms 20a and 20b to push sleeves 8a and 8b out and away from the vehicle seat 7 occupant as already described. Next, when the belts 93 and 92 reach their inoperative positions, switch 83 (S2) closes (FIG. 9) and switch 79 (S9) opens, RELAY 210 is deactivated and armature SR210 moves to its right terminal position (FIG. 9), which stops motor 104. Note that in the situation where the door 14b was opened to retract the belts 92 and 93, if the door 14b is subsequently closed, then the switch 78 (S1) will move to its "close" position, and since the switch 83 (S2) is also closed (i.e., once the belts 92 and 93 are in their inoperative positions), the motor 104 will be activated to move the belts 92 and 93 back into their operative positions (if there still is a seat 7 occupant, i.e., if the switch 74 (S4) is still closed). On the other hand, in the situation where only the switch 70 (S7) was manually moved (closed) to retract the belts 92 and 93, and the door 14b was not opened, then either opening and closing the door 14b or moving (opening) the switch 70 (S7) subsequently will similarly activate the motor 104 to move the belts 92 and 93 back to their operative positions. Also, note that in the alternative embodiment of FIG. 6b, analogous operations to those described above would occur instead with motors 104a and 104b moving the belts 93 and 92 along tracks 13a and 13b. This completes a description of the circuit 100 which controls the motion of the belts 92 and 93 between their respective inoperative and operative positions.

It is intended that the scope of the present invention also include various other embodiments. For example, although circuit 100 is schematically shown in FIG. 9 as having particular types of electrical components, such as relays, switches, etc., it is to be understood that this is meant to be by way of illustration only, and, therefore, not overly limiting. Indeed, other circuit embodiments may occur to those skilled in the art which would work equally well as circuit 100 of FIG. 9. These other circuit embodiments may include other electrical devices or electronic (or optical) digital logic devices instead of relays, and/or various types of electrical or electronic (or optical) switches.

Accordingly, it should also be understood that each of the embodiments disclosed herein, including the preferred embodiment, includes features and characteristics which are considered independently inventive. Thus, the disclosure of variations and alterations of the preferred embodiment is intended only to reflect on the breadth of the scope of the present invention without suggesting that any of the specific features and characteristics of the preferred embodiment are more obvious or less important.

Regarding specific application of the many inventive aspects of the present invention, a variety of environmental and economic considerations are understood to contribute to the alteration or omission of selected inventive aspects. For example, while the preferred embodiment includes two safety belt sleeves which automatically move out and away from, or back toward, a vehicle seat occupant, such is not the case with some other embodiments of the present invention where conservation of vehicle space is a concern or the drivers of a particular type of car prefer to have only one automated sleeve. Likewise, mere positioning of any of the elements of the motorized safety belt system to another location in the vehicle is certainly contemplated depending on vehicle shapes, seating arrangements, and structural aspects. Furthermore, other embodiments of the present invention include enabling either one of the lap belt or the shoulder belt to be voluntarily and switchably moved from its operative position to its inoperative position in a dual track system with the seat occupant's vehicle door opened or closed and the vehicle ignition turned on. Still other embodiments include a single antenna-type motor system to move both of the sleeves sheathing the lap belt and the shoulder belt instead of the two motor system of the preferred embodiment.

While the embodiments of the present invention which have been disclosed herein are the first preferred forms, other embodiments of the method and apparatus of the present invention will suggest themselves to persons skilled in the art in view of this disclosure. Therefore, it will be understood that variations and modifications can be effected within the spirit and scope of the invention and that the scope of the present invention should only be limited by the claims below. It is also understood that any relative dimensions and relationships shown on the drawings are given as the preferred relative dimensions and relationships, but the scope of the invention is not to be limited thereby. Furthermore, the corresponding structures, materials, acts, and equivalents of all means or step plus function elements in the claims below are intended to include any structure, material, or acts for performing the functions in combination with other claimed elements as specifically claimed.

What is claimed is:

1. A motorized restraint system for a vehicle, comprising:
   a shoulder belt having a first end proximate a floor of the vehicle and to a first side of an occupant of a seat of the vehicle, and a second end movable from a first operative position to a first inoperative position;
   a lap belt having a third end proximate the floor on the first side of the occupant, and a fourth end movable from a second operative position to a second inoperative position;
   a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;
   a first switch disposed in the seat that is activated by the weight of the occupant;

a second switch disposed in the vehicle that is activated by the occupant;

means for moving said lap belt and said shoulder belt between the second operative and inoperative positions and the first operative and inoperative positions, respectively; when said first and second switches are activated;

a first curved plastic sleeve proximate a shoulder belt retractor and proximate an inside portion of the seat, said first curved plastic sleeve having a short length of said shoulder belt inside said first curved plastic sleeve, and including
 a first upper semi-rigid portion, and
 a first lower rigid portion attached to the first upper semi-rigid portion;

a second curved plastic sleeve proximate a lap belt retractor and proximate an inside portion of said seat, said second curved plastic sleeve having a short length of said lap belt inside said second curved plastic sleeve, and including
 a second upper semi-rigid portion, and
 a second lower rigid portion attached to the second upper semi-rigid portion;

a first hinge and spring combination attached to said first curved plastic sleeve between the first upper semi-rigid portion and the first lower rigid portion; and a second hinge and spring combination attached to said second curved plastic sleeve between the second upper semi-rigid portion and the second lower rigid portion, wherein the first end of said shoulder belt and the third end of said lap belt are proximate the lap of the occupant as said shoulder belt and said lap belt move into the first operative position and the second operative position, respectively, and said first and second hinge and spring combinations allow tension on said lap and shoulder belts as said lap and shoulder belts move into the second and first operative positions, respectively, to cause said lap and shoulder belts to be pulled close to the occupant, and wherein said first and second hinge and spring combinations cause the first end of said shoulder belt and the third end of said lap belt, respectively, to be held out in front of the occupant when said lap belt and said shoulder belt are not in said second and first operative positions, respectively.

2. The restraint system as claimed in claim 1, wherein the second end of said shoulder belt includes a first connector attached thereto, and further comprising adjustable means for stopping and selectively positioning the first connector of said shoulder belt.

3. The restraint system as claimed in claim 2, wherein said adjustable means comprises a stop pin inserted through a hole defined in said track.

4. The restraint system as claimed in claim 1, wherein said second switch is located proximate one of a door handle and a door post of a door of the vehicle.

5. The restraint system as claimed in claim 1, wherein the second end of said shoulder belt and the fourth end of said lap belt comprise curved semi-rigid plastic sleeves.

6. The restraint system as claimed in claim 1, further comprising:
 a shoulder belt retractor proximate the seat;
 a lap belt retractor proximate the seat;
 a first curved plastic sleeve proximate said shoulder belt retractor and proximate an inside portion of the seat, said first curved plastic sleeve having a short length of said shoulder belt inside said first curved plastic sleeve;
 a second curved plastic sleeve proximate said lap belt retractor and proximate an inside portion of said seat, said second curved plastic sleeve having a short length of said lap belt inside said second curved plastic sleeve,
 wherein the first end of said shoulder belt and the third end of said lap belt are proximate the lap of the occupant as said shoulder belt and said lap belt move into the first operative position and the second operative position, respectively, and
 wherein said first and second curved plastic sleeves hold the first end of said shoulder belt and the third end of said lap belt, respectively, out in front of the occupant when said lap belt and said shoulder belt are not in said second and first operative positions, respectively.

7. A motorized restraint system for a vehicle, comprising:

a shoulder belt having a first end proximate a floor of the vehicle and to a first side of an occupant of a seat of the vehicle, and a second end movable from a first operative position to a first inoperative position;

a lap belt having a third end proximate the floor on the first side of the occupant, and a fourth end movable from a second operative position to a second inoperative position;

a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;

a first switch disposed in the seat that is activated by the weight of the occupant;

a second switch disposed in the vehicle that is activated by the occupant;

means for moving said lap belt and said shoulder belt between the second operative and inoperative positions and the first operative and inoperative positions, respectively when said first and second switches are activated;

a first curved plastic sleeve proximate a shoulder belt retractor and proximate an inside portion of the seat, said first curved plastic sleeve having a short length of said shoulder belt inside said first curved plastic sleeve, and including
 a first upper semi-rigid portion, and
 a first lower rigid portion attached to the first upper semi-rigid portion; and a second curved plastic sleeve proximate a lap belt retractor and proximate an inside portion of said seat, said second curved plastic sleeve having a short length of said lap belt inside said second curved plastic sleeve, and including
 a second upper semi-rigid portion, and a second lower rigid portion attached to the second upper semi-rigid portion, wherein the first end of said shoulder belt and the third end of said lap belt are proximate the lap of the occupant as said shoulder belt and said lap belt move into the first operative position and the second operative position, respectively, and wherein said first and second semi-rigid upper portions hold the first end of said shoulder belt and the third end of said lap belt, respectively, out in front of the occupant when said lap belt and said shoulder belt are not in said second and first operative positions, respectively.

8. A motorized restraint system for a vehicle, comprising:
a shoulder belt having a first end proximate a floor of the vehicle and to a first side of an occupant of a seat of the vehicle, and a second end movable from a first operative position to a first inoperative position;
a lap belt having a third end proximate the floor on the first side of the occupant, and a fourth end movable from a second operative position to a second inoperative position;
a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;
a first switch disposed in the seat that is activated by the weight of the occupant;
a second switch disposed in the vehicle that is activated by the occupant;
means for moving said lap belt and said shoulder belt between the second operative and inoperative positions and the first operative and inoperative positions, respectively when said first and second switches are activated;
seat belt retractors proximate an inside portion of the seat;
semi-rigid curved plastic sleeves disposed on the first end of said shoulder belt and the third end of said lap belt proximate said seat belt retractors, said semi-rigid curved plastic sleeves having channels;
rigid curved sliding inserts disposed within said semi-rigid curved plastic sleeves, said rigid curved sliding inserts having engagement portions and rails; and
motors proximate the inside portion of the seat, said motors having arms which engage the engagement portions of said rigid curved sliding inserts,
whereby said semi-rigid curved plastic sleeves hold the first end of said shoulder belt and the third end of said lap belt well out in front of the occupant, and said motors reversibly extend the arms to reversibly move said rigid curved sliding inserts with the rails inside the channels.

9. A motorized restraint system for a vehicle, comprising:
a shoulder belt having a first end proximate a floor of the vehicle and to a first side of an occupant of a seat of the vehicle, and a second end movable from a first operative position to a first inoperative position;
a lap belt having a third end proximate the floor on the first side of the occupant, and a fourth end movable from a second operative position to a second inoperative position;
a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;
a first switch disposed in the seat that is activated by the weight of the occupant;
a second switch disposed in the vehicle that is activated by the occupant;
means for moving said lap belt and said shoulder belt between the second operative and inoperative positions and the first operative and inoperative positions, respectively when said first and second switches are activated;
wherein said shoulder belt includes a first connector movable along said track, wherein a drive belt is movable around the doorway and engages said first connector for moving the second end of said shoulder belt, and wherein said lap belt includes a second connector movable along said track which engages the drive belt for movement with said first connector between operative and inoperative positions, and
wherein the third end of said lap belt is disposed within a first sleeve to hold the third end of said lap belt out in front of the occupant, and wherein the first end of said shoulder belt is disposed within a second sleeve to hold the first end of said shoulder belt out in front of the occupant, the first end of said shoulder belt and the third end of said lap belt being proximate the lap of the occupant as said shoulder belt and said lap belt move into the first operative position and the second operative position, respectively.

10. A motorized restraint system for a vehicle, comprising:
a shoulder belt having a first end proximate a floor of the vehicle and to a first side of an occupant of a seat of the vehicle, and a second end movable from a first operative position to a first inoperative position;
a lap belt having a third end proximate the floor on the first side of the occupant, and a fourth end movable from a second operative position to a second inoperative position;
a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;
a first switch disposed in the seat that is activated by the weight of the occupant;
a second switch disposed in the vehicle that is activated by the occupant;
means for moving said lap belt and said shoulder belt between the second operative and inoperative positions and the first operative and inoperative positions, respectively when said first and second switches are activated;
a rigid insert disposed within a sleeve proximate the third end of said lap belt and proximate a center portion of the seat;
an arm disposed within said sleeve and coupled to said insert;
a motor coupled to said arm; and
wherein said shoulder belt includes a first connector movable along said track, wherein a drive belt is movable around the doorway and engages said first connector for moving the second end of said shoulder belt, and wherein said lap belt includes a second connector movable along said track which engages the drive belt for movement with said first connector between operative and inoperative positions, and whereby said motor reversibly positions said arm to reversibly position said insert to move the third end of said lap belt away from the occupant when the second connector of said lap belt begins to move to one of the second inoperative position and the second operative position, and to move the third end of said lap belt toward the occupant when the second connector of said lap belt reaches the second operative position.

11. The restraint system as claimed in claim 11, wherein the second end of said shoulder belt and the fourth end of said lap belt are proximate said track and are attached to the first connector and the second connector, respectively, and are semi-rigid.

12. The restraint system as claimed in claim 10, wherein said insert comprises plastic.

13. The restraint system as claimed in claim 10, wherein said insert is semi-rigid.

14. The restraint system as claimed in claim 10, wherein said insert is curved.

15. A motorized restraint system for a vehicle, comprising:

a shoulder belt having a first end proximate a floor of the vehicle and to a first side of an occupant of a seat of the vehicle, and a second end movable from a first operative position to a first inoperative position;

a lap belt having a third end proximate the floor on the first side of the occupant, and a fourth end movable from a second operative position to a second inoperative position;

a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;

a first switch disposed in the seat that is activated by the weight of the occupant;

a second switch disposed in the vehicle that is activated by the occupant;

means for moving said lap belt and said shoulder belt between the second operative and inoperative positions and the first operative and inoperative positions, respectively when said first and second switches are activated;

rigid curved plastic inserts disposed within sleeves proximate the first end of said shoulder belt and the third end of said lap belt and proximate a center portion of the seat;

arms disposed within said sleeves and coupled to said rigid curved plastic inserts;

motors coupled to said arms; and wherein said shoulder belt includes a first connector movable along said track, wherein a drive belt is movable around the doorway and engages said first connector for moving the second end of said shoulder belt, and wherein said lap belt includes a second connector movable along said track which engages the drive belt for movement with said first connector between operative and inoperative positions, whereby, said second switch activates said motors to move said arms to extend said rigid curved plastic inserts within the sleeves away from said motors to position said shoulder belt and said lap belt out in front of the occupant for subsequent motion, acceptable to the occupant, of said shoulder belt and said lap belt to the first and second operative positions, respectively, and whereby, said second switch activates said motors to move said arms to retract said rigid curved plastic inserts within the sleeves toward said motors to position said shoulder belt and said lap belt easily across the lap of the occupant as said shoulder belt and said lap belt move to the first and second operative positions, respectively.

16. A motorized restraint system for a vehicle, comprising:

a shoulder belt having a first end proximate a floor of the vehicle and to a first side of an occupant of a seat of the vehicle, and a second end movable from a first operative position to a first inoperative position;

a lap belt having a third end proximate the floor on the first side of the occupant, and a fourth end movable from a second operative position to a second inoperative position;

a track proximate a doorway of the vehicle, wherein the first and second inoperative positions are along the track forward of the doorway, the first operative position is along the track rearward of the doorway proximate a shoulder of the occupant and to a second side of the occupant, and the second operative position is along the track rearward of the doorway proximate a lap of the occupant and to the second side of the occupant;

a first switch disposed in the seat that is activated by the weight of the occupant;

a second switch disposed in the vehicle that is activated by the occupant;

means for moving said lap belt and said shoulder belt between the second operative and inoperative positions and the first operative and inoperative positions, respectively when said first and second switches are activated;

wherein said shoulder belt includes a first connector movable along said track, wherein a drive belt is movable around the doorway and engages said first connector for moving the second end of said shoulder belt, and wherein said lap belt includes a second connector movable along said track which engages the drive belt for movement with said first connector between operative and inoperative positions, wherein the drive belt defines an elongated slot having a forward end and a rearward end, wherein the drive belt includes a catch located at the rearward end of the slot which apprehends and holds the first connector of said shoulder belt when said shoulder belt is in the first inoperative position, wherein the catch holds the first connector of said shoulder belt approximately a few inches apart from the second connector of said lap belt, thereby allowing out-of-the-way storage with the second end and the fourth end of said shoulder and lap belts, respectively, together when said shoulder and lap belts are in the first and second inoperative positions, and during motion of said shoulder and lap belts between the first and second operative positions and the first and second inoperative positions, respectively, wherein the catch releases the first connector when the drive belt moves the first connector of said shoulder belt to the first operative position and the second connector of said lap belt toward the second operative position, respectively, wherein the first connector of said shoulder belt is stopped in the first operative position by a stop in said track, wherein the second connector of said lap belt continues to be moved by the drive belt with the slot moving past the stopped first connector until the second connector reaches the second operative position, and wherein the forward end of said slot is proximate the first connector and maintains the first connector in the first operative position while the second connector is in the second operative position.

17. The restraint system as claimed in claim 16, wherein as the second connector of said lap belt moves back toward the second inoperative position, the catch apprehends and holds the first connector of said shoulder belt.

18. The restraint system as claimed in claim 16, wherein the catch comprises a magnetic catch that magnetically apprehends and holds the first connector.

19. A restraint system for a vehicle, comprising:

a shoulder belt being movable between a first inoperative position and a first operative position and having a first connector;

a lap belt being movable between a second inoperative position and a second operative position and having a second connector;

a movable drive belt having a slot therein, said belt coupled to the first and second connectors of said shoulder belt and said lap belt, respectively, at the slot, said drive belt reversibly driven to move said shoulder belt between the first inoperative position and the first operative position and to move said lap belt between the second inoperative position and the second operative position;

a catch affixed to said drive belt releasably coupled to the first connector of said shoulder belt during transition between the first inoperative position and the first operative position; and wherein the slot maintains said shoulder belt in said first operative position when said lap belt is in the second operative position.

* * * * *